United States Patent
Yang et al.

(10) Patent No.: US 9,604,399 B2
(45) Date of Patent: Mar. 28, 2017

(54) INJECTION MOLDING FLOW CONTROL APPARATUS AND METHOD

(71) Applicant: Synventive Molding Solutions, Inc., Peabody, MA (US)

(72) Inventors: Lin Yang, Lynnfield, MA (US); Vito Galati, Rowley, MA (US); Sergio Antunes, Scottsdale, AZ (US)

(73) Assignee: Synventive Molding Solutions, Inc., Peabody, MA (US)

( * ) Notice: Subject to any disclaimer, the term of this patent is extended or adjusted under 35 U.S.C. 154(b) by 51 days.

(21) Appl. No.: 14/708,533

(22) Filed: May 11, 2015

(65) Prior Publication Data
US 2015/0239162 A1    Aug. 27, 2015

Related U.S. Application Data

(60) Continuation of application No. PCT/US2013/071667, filed on Nov. 25, 2013, and a
(Continued)

(51) Int. Cl.
*B29C 45/77* (2006.01)
*B29C 45/28* (2006.01)
(Continued)

(52) U.S. Cl.
CPC ............ *B29C 45/77* (2013.01); *B29C 45/281* (2013.01); *B29C 45/76* (2013.01);
(Continued)

(58) Field of Classification Search
CPC .... B29C 2045/2712; B29C 2045/2872; B29C 45/281; B29C 45/82; B29C 2045/2817; B29C 2945/76307
See application file for complete search history.

(56) References Cited

U.S. PATENT DOCUMENTS 6,589,039 B1    7/2003 Doughty et al.
6,632,079 B1    10/2003 Kazmer et al.
(Continued)

FOREIGN PATENT DOCUMENTS

WO    2012074879 A1    6/2012

OTHER PUBLICATIONS

International Preliminary Report on Patentability mailed Mar. 5, 2015 in Int'l Appln. No. PCT/US2013/071667.
(Continued)

*Primary Examiner* — Jill Heitbrink
(74) *Attorney, Agent, or Firm* — Polsinelli PC

(57) ABSTRACT

An apparatus for controlling the rate of flow of fluid mold material from an injection molding machine to a mold cavity, the apparatus comprising: a manifold having a fluid delivery channel, an actuator interconnected to a valve pin having a tip end drivable between a first position, a second position upstream and a third position upstream of the second position, the actuator and the valve pin being translationally driven by a valve system adjustable between a start position, a plurality of intermediate drive rate positions and a high drive rate position, a pressure sensor and a controller, the pressure sensor sensing a metered pressure of a drive fluid, the controller instructing the valve system to drive valve pin continuously upstream and including instructions that instruct the valve system to move according to a predetermined profile of metered pressures from the start position to selected intermediate drive rate positions and subsequently to the high drive rate position.

41 Claims, 17 Drawing Sheets

Related U.S. Application Data continuation-in-part of application No. 14/567,369, filed on Dec. 11, 2014, which is a division of application No. 13/484,336, filed on May 31, 2012, now Pat. No. 9,011,736, which is a continuation of application No. PCT/US2011/062099, filed on Nov. 23, 2011, application No. 14/708,533, which is a continuation-in-part of application No. 14/567,308, filed on Dec. 11, 2014, which is a division of application No. 13/484,408, filed on May 31, 2012, now Pat. No. 9,005,509, which is a continuation of application No. PCT/US2011/062096, filed on Nov. 23, 2011, application No. 14/708,533, which is a continuation-in-part of application No. PCT/US2014/043612, filed on Jun. 23, 2014, and a continuation-in-part of application No. PCT/US2013/075064, filed on Dec. 13, 2013, and a continuation-in-part of application No. PCT/US2014/031000, filed on Mar. 18, 2014, and a continuation-in-part of application No. PCT/US2014/032658, filed on Apr. 2, 2014.

(60) Provisional application No. 61/730,296, filed on Nov. 27, 2012, provisional application No. 61/736,878, filed on Dec. 13, 2012, provisional application No. 61/770,781, filed on Feb. 28, 2013, provisional application No. 61/802,878, filed on Mar. 18, 2013, provisional application No. 61/838,620, filed on Jun. 24, 2013, provisional application No. 61/475,340, filed on Apr. 14, 2011, provisional application No. 61/416,583, filed on Nov. 23, 2010, provisional application No. 61/843,561, filed on Jul. 8, 2013, provisional application No. 61/896,313, filed on Oct. 28, 2013, provisional application No. 61/814,045, filed on Apr. 19, 2013, provisional application No. 61/827,897, filed on May 28, 2013, provisional application No. 61/828,454, filed on May 29, 2013.

(51) Int. Cl.
*B29C 45/76* (2006.01)
*B29C 45/27* (2006.01)
*B29C 45/17* (2006.01)

(52) U.S. Cl.
CPC .. *B29C 45/2703* (2013.01); *B29C 2045/1792* (2013.01); *B29C 2045/2712* (2013.01); *B29C 2045/2865* (2013.01); *B29C 2045/2872* (2013.01); *B29C 2945/76006* (2013.01); *B29C 2945/7628* (2013.01); *B29C 2945/76076* (2013.01); *B29C 2945/76083* (2013.01); *B29C 2945/76277* (2013.01); *B29C 2945/76381* (2013.01); *B29C 2945/76545* (2013.01); *B29C 2945/76598* (2013.01); *B29C 2945/76755* (2013.01); *B29C 2945/76859* (2013.01); *B29C 2945/76933* (2013.01)

(56) References Cited

U.S. PATENT DOCUMENTS

| | | | |
|---|---|---|---|
| 2010/0225025 A1* | 9/2010 | Striegel | B29C 45/0025 264/328.8 |
| 2012/0248644 A1* | 10/2012 | de Oliveira Antunes | B29C 45/2703 264/40.5 |
| 2012/0248652 A1 | 10/2012 | Galati et al. | |
| 2014/0046465 A1* | 2/2014 | de Oliveira Antunes | B29C 45/76 700/97 |

OTHER PUBLICATIONS

International Serach Report and Written Opinion mailed Mar. 17, 2014 in Int'l Appln. No. PCT/US2013/071667.

* cited by examiner

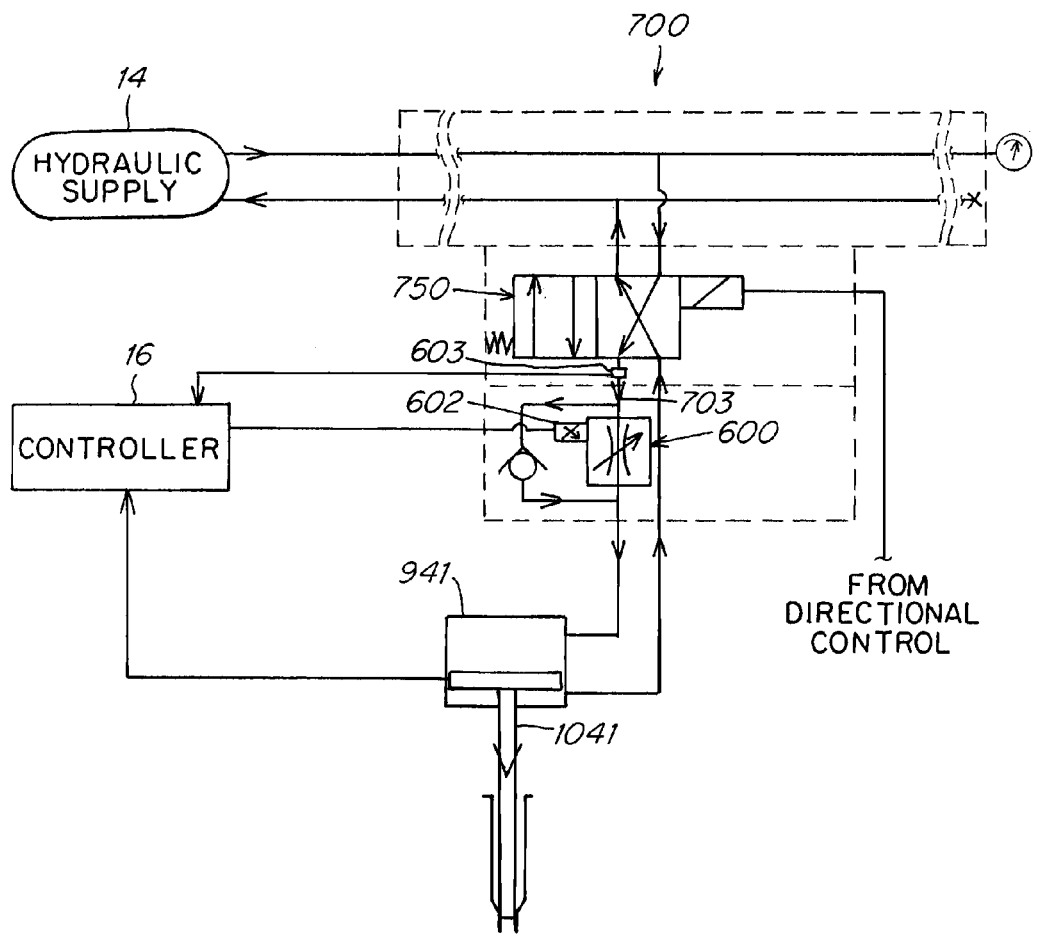
Fig. 2AAA

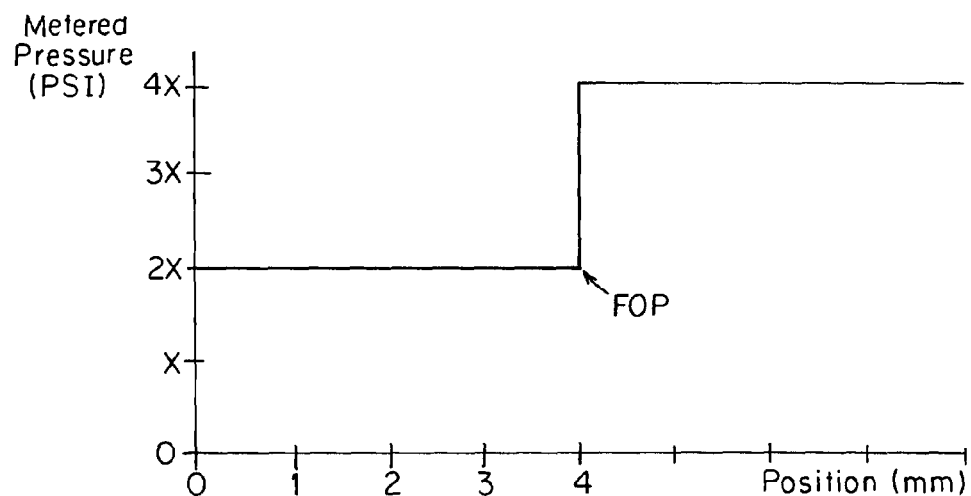
Fig. 5AA
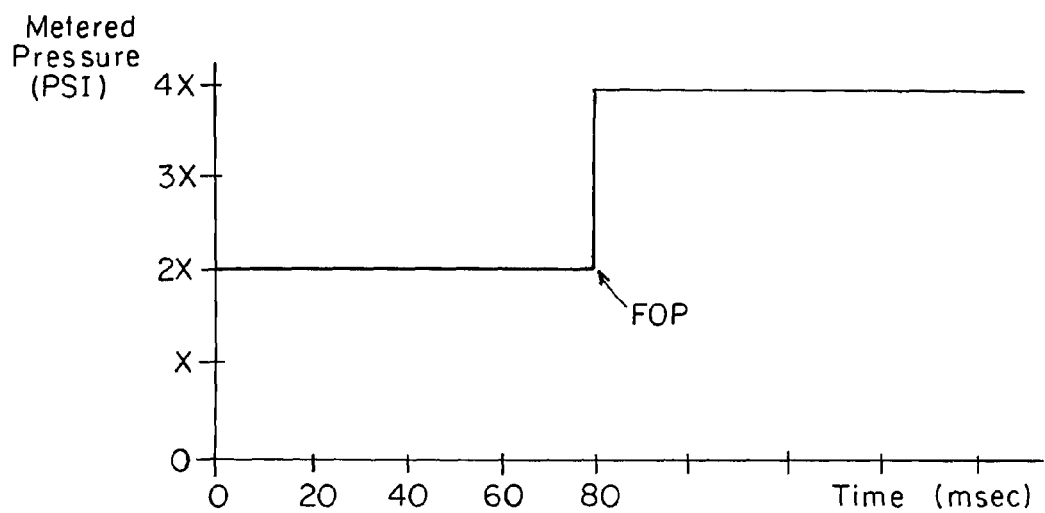
Fig. 5AAA

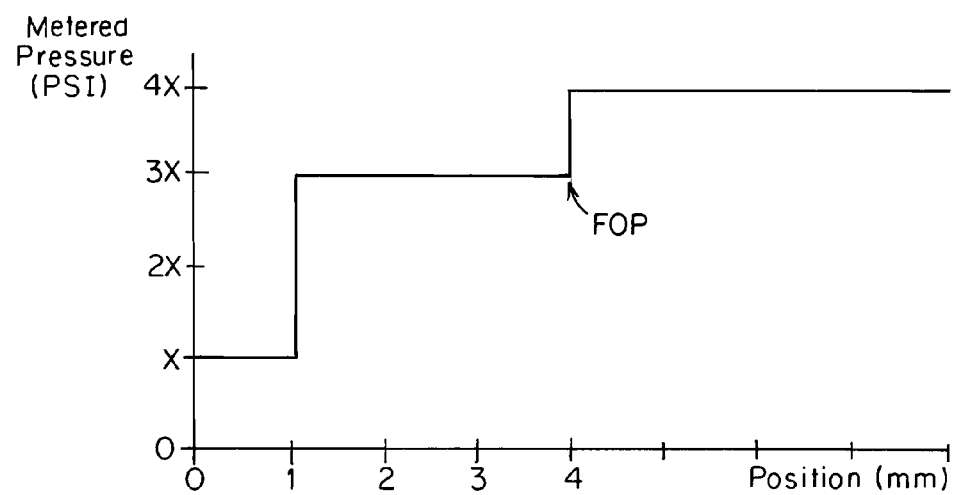
Fig. 5BB
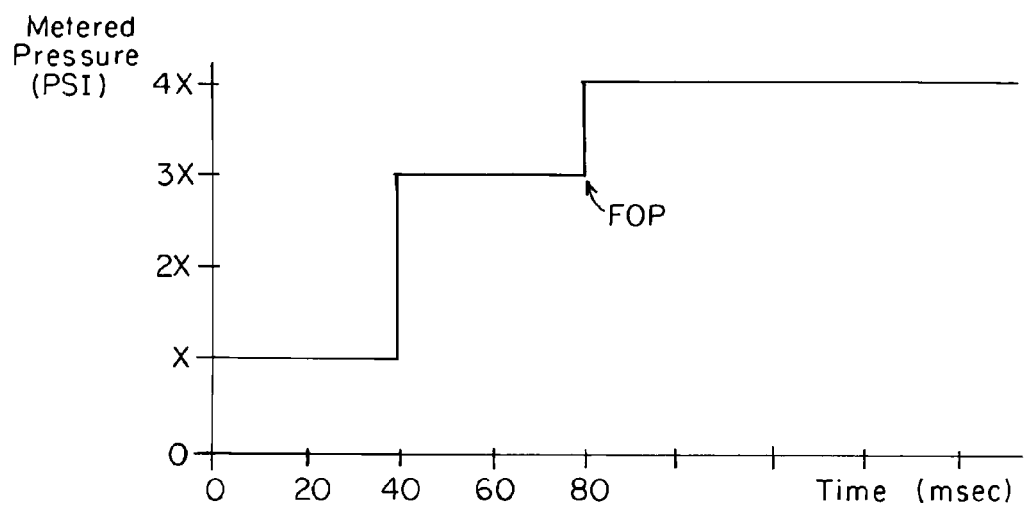
Fig. 5BBB

INJECTION MOLDING FLOW CONTROL APPARATUS AND METHOD

RELATED APPLICATIONS

This application is a continuation of and claims the benefit of priority to international application PCT/US2013/071667 filed Nov. 25, 2013 the disclosure which is incorporated herein by reference in its entirety as if fully set forth herein. This application is also a continuation-in-part of and claims the benefit of priority to U.S. application Ser. No. 14/567,369 filed Dec. 11, 2014 and U.S. application Ser. No. 14/567,308 filed Dec. 11, 2014, the disclosures of both of which are incorporated herein by reference in their entirety as if fully set forth herein. This application is also a continuation-in-part of and claims the benefit of priority to international application PCT/US2014/043612 filed Jun. 23, 2014 the disclosure which is incorporated herein by reference in its entirety as if fully set forth herein. This application is also a continuation-in-part of and claims the benefit of priority to international application PCT/US2013/075064 filed Dec. 13, 2013 the disclosure which is incorporated herein by reference in its entirety as if fully set forth herein. This application is also a continuation-in-part of and claims the benefit of priority to international application PCT/US2014/019210 filed Feb. 28, 2014 the disclosure which is incorporated herein by reference in its entirety as if fully set forth herein. This application is also a continuation-in-part of and claims the benefit of priority to international application PCT/US2014/031000 filed Mar. 18, 2014 the disclosure which is incorporated herein by reference in its entirety as if fully set forth herein. This application is also a continuation-in-part of and claims the benefit of priority to international application PCT/US2014/032658 filed Apr. 2, 2014 the disclosure which is incorporated herein by reference in its entirety as if fully set forth herein.

The disclosures of all of the following are incorporated by reference in their entirety as if fully set forth herein: International Application Publication No. WO2012/074879, U.S. Patent Application Publication No. 2012/0248644, International Application Publication No. 2012/087491, U.S. Patent Application Publication No. 2012/0248652, U.S. Pat. No. 5,894,025, U.S. Pat. No. 6,062,840, U.S. Pat. No. 6,294,122, U.S. Pat. No. 6,309,208, U.S. Pat. No. 6,287,107, U.S. Pat. No. 6,343,921, U.S. Pat. No. 6,343,922, U.S. Pat. No. 6,254,377, U.S. Pat. No. 6,261,075, U.S. Pat. No. 6,361,300 (7006), U.S. Pat. No. 6,419,870, U.S. Pat. No. 6,464,909 (7031), U.S. Pat. No. 6,599,116, U.S. Pat. No. 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070), U.S. Pat. No. 8,297,836 (7087), U.S. Pat. No. 8,328,549 (7096) and international applications PCT/US2011/062099 (7100) and PCT/US2011/062096 (7100).

BACKGROUND OF THE INVENTION

Injection molding systems have been developed having flow control mechanisms that control the movement of a valve pin over the course of an injection cycle to cause the pin to move either upstream or downstream over the course of injection cycle in order to raise or lower the rate of flow of fluid material to correspond to a predetermined profile of fluid flow rates for the injection cycle. A sensor can sense a condition of the injection fluid material or of the apparatus such as pin position and send a signal indicative of the sensed condition to a program contained in a controller that uses the signal as a variable input to control movement of the valve pin in accordance with the predetermined profile.

SUMMARY OF THE INVENTION

In accordance with the invention there is provided a method of performing an injection molding cycle in an injection molding apparatus comprising:

an injection molding machine and a manifold that receives an injected mold material from the injection molding machine, the manifold having a delivery channel that delivers the mold material under an injection pressure to a first gate of a mold cavity, an actuator interconnected to a valve pin driving the valve pin from a first position where the tip end of the valve pin obstructs the gate to prevent the injection fluid material from flowing into the cavity, upstream to a second position upstream of the gate where the mold material flows at a high rate through the gate and continuously upstream from the start position through one or more intermediate positions between the first position and the second position wherein the tip end of the valve pin restricts flow of the injection mold material to one or more rates less than the high rate, a valve system for controllably driving the valve pin, the valve system being controllably movable from a start position to a plurality of intermediate drive rate positions and a high drive rate position, the high drive rate position driving the pin upstream at a high rate of travel, the intermediate drive rate positions driving the pin upstream at one or more intermediate rates of travel that are less than the high rate of travel, the valve system including a fluid flow line routing a drive fluid out of an exit of the valve system under a metered drive pressure, the method comprising:

selecting one or more lengths of time for the valve system to operate or reside in one or more of the plurality of intermediate drive rate positions, beginning an injection cycle with the tip end of the valve pin in the first position and the valve system in the start position, sensing the metered pressure of the drive fluid within the fluid flow line, selecting a profile of metered pressures versus the selected one or more lengths of time where the profile of metered pressures correspond to selected ones of the plurality of intermediate drive rate positions, adjusting the valve system according to the selected profile to operate at the selected ones of the plurality of intermediate drive rate positions for the selected one or more lengths of time to drive the valve pin continuously upstream.

The step of adjusting can comprises operating the valve system at one or more selected intermediate drive rate positions for the length of an entire injection cycle where the pin travels from the first position to an end of stroke position with the valve system in one or more selected intermediate drive rate positions.

The method can further comprise adjusting the valve system to operate at the high drive rate position to drive the tip end of the valve pin continuously upstream at the high rate of travel upon expiration of the selected one or more lengths of time.

The valve system can be adjusted to operate at the one or more intermediate drive rate positions after the mold material has been injected into the cavity through another gate and has travelled through the cavity past the first gate.

The valve system can be adjusted to operate at a single intermediate drive rate position for a single selected length of time.

The valve system can be interconnected to an electrical signal generating device operable to generate electrical signals of controllably variable output, the valve system being adjustable in drive rate position to increase the flow of drive fluid to a degree that is proportional to the degree of output of the electrical signals, the steps of adjusting the valve system comprising operating the electrical signal generating device to generate electrical signals that adjust the drive rate positions of the valve system according electrical signals of selected degree of output.

Each of the drive rate positions of the valve system typically have a degree of openness, the drive fluid of the valve system driving the actuator and the valve pin at a rate that is proportional to the degree of openness of the positions of the valve system, the one or more intermediate drive rate positions having a degree of openness that is less than the degree of openness of the high drive rate flow position.

The length of travel between the first position and the one or more intermediate positions along the drive path is typically between about 1 mm and about 5 mm.

In another aspect of the invention there is provided an apparatus for controlling the rate of flow of mold material to a mold cavity, the apparatus comprising:
an injection molding machine and a manifold that receives the injected mold material from the machine, the manifold having a delivery channel that delivers the mold material at one or more flow rates through a gate to the mold cavity,
an actuator interconnected to a valve pin having a tip end, the actuator being drivable to move the valve pin along a path of travel starting from a downstream gate closed position continuously upstream to and through a series of successively upstream intermediate upstream gate open positions and further continuously upstream to a high upstream gate open position,
a valve system in fluid communication with the actuator to drive the actuator with drive fluid at one or more rates of travel, the valve system having a start position, a plurality of intermediate drive rate positions and a high drive rate position, the start position holding the valve pin in the gate closed position, the high drive rate position driving the actuator upstream at a selected high velocity, the plurality of intermediate drive rate positions driving the actuator upstream at one or more corresponding velocities that are less than the selected high velocity,
a controller interconnected to the valve system, the controller being adapted to control movement of the valve system between the start position, the plurality of intermediate drive rate positions and the high drive rate position,
a pressure sensor sensing a metered pressure of a drive fluid flowing out of an exit of the valve system, the metered pressure corresponding to a drive rate position of the valve system, the pressure sensor sending a signal indicative of the metered pressure to the controller;
the controller including instructions that instruct the valve system to move from the start position to selected ones of the plurality of intermediate drive rate positions according to a predetermined profile of metered pressures versus one or more preselected amounts of time and further drives the valve system to move from the selected ones of the plurality of intermediate drive rate positions to the high drive rate position on expiration of the one or more preselected amounts of time.

The positions of the valve system typically each have a corresponding degree of openness, the controller being adapted to generate an electrical signal of selectable degree of output, the degree of openness of the positions of the valve system being proportional to the degree of output of the electrical signal generated by the controller.

The output of the electrical signal is typically one or more of electrical energy, electrical power, voltage, current or amperage.

The degree of openness of the positions of the valve system preferably each have a corresponding rate of flow of the drive fluid that is proportional to the corresponding degree of openness of the positions of the valve system.

The tip end of the valve pin can obstruct the gate to prevent the mold material from flowing into the cavity in the first position, the mold material flows at the high rate through the gate in the second position and the tip end of the valve pin restricts the flow of the mold material to less than the high rate in the one or more intermediate upstream positions between the first position and the second position, and wherein the valve pin is in one or more of the intermediate upstream positions when the valve system is in the one or more intermediate drive rate positions.

the rate of travel of the actuator that corresponds to a highest of the one or more intermediate drive rate positions of the valve system is typically less than about 75% of the rate of travel of the actuator that corresponds to the high drive rate position of the valve system.

Each of the positions of the valve system preferably have a corresponding degree of openness, the actuator being driven at a velocity that is proportional to the degree of openness of the positions of the valve system, the electrical signals generated by the controller each having a degree of output that adjusts the valve system to a degree of openness that is proportional to the degree of output of the electrical signals.

The controller is preferably programmable to automatically generate one or more first electrical signals having one or more corresponding first selected degrees of output that move the valve system to the one or more intermediate drive rate positions to drive the actuator continuously upstream at one or more corresponding first velocities that are less than the high velocity, the controller generating a second electrical signal on expiration of the one or more predetermined amounts of time, the second electrical signal having a second selected degree of output that moves the valve system to the high drive rate position to drive the actuator at the high velocity.

The controller can include electrical or electronic instructions interconnected to an electrical signal generator that automatically instructs the electrical signal generator to generate the electrical signals that drive the valve system to move from the start position to the one or more intermediate drive positions and to remain in the one or more intermediate drive positions for the one or more predetermined amounts of time and further instructs the electrical signal generator to generate an electrical signal that drives the valve system to move from the one or more intermediate drive positions to the high drive position on expiration of the one or more predetermined amounts of time.

Each of the positions of the valve system preferably have a corresponding degree of openness, the actuator being driven at a velocity that is proportional to the degree of openness of the positions of the valve system, the electrical signals generated by the controller each having a degree of output that adjusts the valve system to a degree of openness that is proportional to the degree of output of the electrical signals.

The output of the electrical signal is typically one or more of electrical energy, electrical power, voltage, current or amperage.

In another aspect of the invention there is provided a sequentially gated molding system comprising a mold having first and second gates leading to a common cavity and a manifold having first and second fluid flow channels respectively delivering a fluid mold material through the first and second gates into the cavity, the system comprising:

a first valve controlling delivery of the fluid material through the first gate into the cavity beginning at a first time;

a second valve controlling delivery of the fluid material through the second gate beginning at a second time subsequent to the first time such that the fluid material has entered the cavity through the first gate and approached the second gate prior to the second time;

the second valve comprising an an actuator interconnected to a valve pin having a tip end, the actuator being drivable to move the valve pin along a path of travel starting from a downstream gate closed position continuously upstream to and through a series of successively upstream intermediate upstream gate open positions and further continuously upstream to a high upstream gate open position, a valve system in fluid communication with the second actuator to drive the second actuator with drive fluid at one or more rates of travel, the valve system having a start position, a plurality of intermediate drive rate positions and a high drive rate position, the start position holding the valve pin in the gate closed position, the high drive rate position driving the second actuator upstream at a selected high velocity, the plurality of intermediate drive rate positions driving the actuator upstream at one or more corresponding velocities that are less than the selected high velocity, a controller interconnected to the valve system, the controller being adapted to control movement of the valve system between the start position, the plurality of intermediate drive rate positions and the high drive rate position, a pressure sensor sensing a metered pressure of a drive fluid flowing out of an exit of the valve system, the metered pressure corresponding to a drive rate position of the valve system, the pressure sensor sending a signal indicative of the metered pressure to the controller;

the controller including instructions that instruct the valve system to move from the start position to selected ones of the plurality of intermediate drive rate positions according to a predetermined profile of metered pressures versus one or more preselected amounts of time and further drives the valve system to move from the selected ones of the plurality of intermediate drive rate positions to the high drive rate position on expiration of the one or more preselected amounts of time.

In another aspect of the invention there is provided a method of performing an injection molding cycle in an injection molding apparatus comprising:

a manifold that receives an injection fluid mold material, the manifold having a delivery channel that delivers the injection fluid mold material under an injection pressure to a first gate of a mold cavity, an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate, the actuator being driven by a valve system that is controllably adjustable between a start position, a plurality of intermediate drive rate positions and a high drive rate position, the actuator being driven upstream at a plurality of corresponding intermediate rates of travel when the valve system is in one of the plurality of intermediate drive rate positions and at a higher rate of travel than the plurality of intermediate rates of travel when the valve system is in the high drive rate position, the valve system including a fluid flow line routing a drive fluid out of an exit of the valve system under a metered pressure, the method comprising:

selecting the length of travel between the first position and the second position, sensing the metered pressure of the drive fluid within the fluid flow line, sensing the position of the valve pin, selecting a profile of metered pressures versus position of the valve pin where the profile of metered pressures correspond to selected ones of the plurality of intermediate drive rate positions, beginning an injection cycle with the tip end of the valve pin in the first position and the valve system in the start position, adjusting the valve system according to the selected profile to operate at the selected ones of the plurality of intermediate drive rate positions to drive the tip end of the valve pin continuously upstream from the first position to the second position, sensing the position of the valve pin to determine when the tip end of the valve pin has reached the second position, adjusting the valve system to operate at the high drive rate position to drive the tip end of the valve pin continuously upstream at the higher rate of travel when the tip end of the valve pin has been determined in the step of sensing to have reached the second position.

In such a method, the step of adjusting the valve system to operate at the one or more selected intermediate drive rate positions is begun after the injection fluid mold material has been previously injected into the cavity through another gate and the fluid mold material has travelled through the cavity past the first gate.

The step of adjusting the valve system to operate at the one or more selected intermediate drive rate positions typically comprises adjusting the valve system to operate at a single intermediate drive rate position.

The high drive rate position of the valve system preferably drives the actuator at a rate of travel that is a maximum at which the valve system is capable of driving the actuator.

The valve system is preferably interconnected to an electrical signal generating device operable to generate an electrical signal of controllably variable degree, the valve system being adjustable in position to increase the flow of drive fluid to a degree that is proportional to the degree of electrical signal input by the electrical signal generating device to the valve system, the steps of adjusting the valve system comprising operating the electrical signal generating device to adjust the positions of the valve system.

Each of the start, intermediate drive rate and high drive rate positions of the valve system can have a different degree of openness, the drive fluid of the valve system driving the actuator and the valve pin at a rate that is approximately proportional to the degree of openness of the positions of the valve system, the one or more intermediate drive rate positions having a degree of openness that is less than the degree of openness of the high drive rate position.

The length of travel between the first position and the second position along the drive path is selected to be between about 1 mm and about 5 mm.

The step of sensing preferably includes sensing the position of the valve pin with a position sensor that automatically sends one or more signals indicative of the position of the tip end of the valve pin to a control mechanism that automatically adjusts the positions of the valve system in response to receipt of the one or more signals from the position sensor.

The control mechanism typically comprises an electrical signal generating device operable to generate an electrical signal of controllably variable degree, the valve system being adjustable in position to a degree of openness that is approximately proportional to the degree of electrical signal input by the electrical signal generating device to the valve system, the steps of adjusting the valve system comprising operating the electrical signal generating device to controllably adjust the degree of electrical signal input to the valve system.

The tip end of the valve pin preferably restricts flow of the injection fluid along the entire length of the drive path extending between the first position and the second position.

In another aspect of the invention there is provided an apparatus for controlling the rate of flow of fluid mold material from an injection molding machine to a mold cavity, the apparatus comprising:
a manifold receiving the injected fluid mold material, the manifold having a delivery channel that delivers the injected fluid material to a first gate leading to the mold cavity;
an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin,
the actuator and the valve pin being translationally driven at a controllable rate of travel by a valve system that is controllably adjustable between a start position, a plurality of intermediate drive rate positions and a high drive rate position, the actuator being driven upstream at a corresponding plurality of intermediate rates of travel when the valve system is in one or more of the plurality of intermediate drive rate positions and at a higher rate of travel than the plurality of intermediate rates of travel when the valve system is in the high drive rate position;
a position sensor,
a pressure sensor,
a controller,
the position sensor sensing the position of the valve pin and sending a signal indicative of the position of the pin to the controller;
the pressure sensor sensing a metered pressure of a drive fluid flowing out of an exit of the valve system, the metered pressure corresponding to a drive rate position of the valve system, the pressure sensor sending a signal indicative of the metered pressure to the controller:
the controller instructing the valve system to drive the actuator and the valve pin continuously upstream from the start position to the second position to the third position;
the controller including instructions that instruct the valve system to move according to a predetermined profile of metered pressures versus pin positions from the start position to selected ones of the plurality of intermediate drive rate positions that correspond to the profile of metered pressures and subsequently move from the selected ones of the plurality of intermediate drive rate positions to the high drive rate position on receipt by the controller of a signal from the position sensor that is indicative of the valve pin having reached the second position.

Such an apparatus preferably further comprises an electrical signal generating device interconnected to the valve system to controllably drive the valve system to selected degrees of openness, the electrical signal generating device generating an electrical signal of controllably variable degree of output, the valve system being adjustable in degree of openness that is approximately proportional to the degree of output of the electrical signal.

The electrical signal generating device is typically interconnected to the controller, the controller instructing the electrical signal generating device to generate electrical signals of varying degrees of output that correspond to a degree of openness of the one or more intermediate drive rate positions and the third drive rate position of the valve system.

The portion of the drive path over which the flow of injected material is restricted is preferably at least about 30% of the length of the drive path between the first position and the second position.

The length of the drive path between the first position and the second position is typically between about 1 mm and about 5 mm.

The valve pin and actuator are preferably driven at a maximum rate of upstream travel that the valve system is capable of driving the actuator at when the valve system is in the high drive rate position.

The rate of travel of the valve pin corresponding to the highest of the one or more intermediate drive positions of the valve system is typically less than about 75% of the rate of travel of the valve pin corresponding to the high drive position.

The positions of the valve system can each have a different degree of openness, the actuator and valve pin being driven at a velocity that is proportional to the degree of openness of the positions of the valve system, the controller instructing the generation of an electrical signal that adjusts the valve system to a degree of openness that is proportional to a degree of output of the electrical signal, the controller being programmable to instruct the generation of one or more first electrical signals having one or more corresponding first selected degrees of output that moves the valve system to the one or more intermediate drive rate positions to drive the actuator at one or more first velocities in an upstream direction, the controller being programmed to instruct the generation of a second electrical signal when the controller receives a signal from the position sensor that the tip end of the valve pin has reached the second position, the second electrical signal having a second selected degree of output that moves the valve system to the high drive rate position that drives the actuator at a second velocity that is higher than the one or more first velocities.

The valve system is typically driven to a degree of openness that is approximately proportional to the degree of output of the electrical signal.

In another aspect of the invention there is provided a sequentially gated molding system comprising a mold having first and second gates leading to a common cavity and a manifold having first and second fluid flow channels respectively delivering a fluid mold material through the first and second gates into the cavity, the system comprising:

a first valve controlling delivery of the fluid material through the first gate into the cavity beginning at a first time;

a second valve controlling delivery of the fluid material through the second gate beginning at a second time subsequent to the first time such that the fluid material has entered the cavity through the first gate and approached the second gate prior to the second time;

the second valve comprising an an actuator interconnected to a valve pin having a tip end drivable along a drive path that extends between a first position where the tip end of the valve pin obstructs the second gate to prevent the injection fluid material from flowing into the cavity, a second position upstream of the first position wherein the tip end of the valve pin restricts flow of the injection fluid through the second gate along at least a portion of the length of the drive path extending between the first position and the second position, and a third position upstream of the second position where the injection fluid material flows freely through the second gate without restriction from the tip end of the pin, the actuator and the valve pin being translationally driven at a controllable rate of travel by a valve system that is controllably adjustable between a start position, a plurality of intermediate drive rate positions and a high drive rate position, the actuator being driven upstream at a corresponding plurality of intermediate rates of travel when the valve system is in one or more of the plurality of intermediate drive rate positions and at a higher rate of travel than the plurality of intermediate rates of travel when the valve system is in the high drive rate position;

a position sensor, a pressure sensor, a controller, the position sensor sensing the position of the valve pin and sending a signal indicative of the position of the pin to the controller;

the pressure sensor sensing a metered pressure of a drive fluid flowing out of an exit of the valve system, the metered pressure corresponding to a drive rate position of the valve system, the pressure sensor sending a signal indicative of the metered pressure to the controller:

the controller instructing the valve system to drive the actuator and the valve pin continuously upstream from the start position to the second position to the third position;

the controller including instructions that instruct the valve system to move according to a predetermined profile of metered pressures versus pin positions from the start position to selected ones of the plurality of intermediate drive rate positions that correspond to the profile of metered pressures and subsequently move from the selected ones of the plurality of intermediate drive rate positions to the high drive rate position on receipt by the controller of a signal from the position sensor that is indicative of the valve pin having reached the second position.

BRIEF DESCRIPTION OF THE DRAWINGS

The above and further advantages of the invention may be better understood by referring to the following description in conjunction with the accompanying drawings in which:

FIG. 2AA is a schematic cross-sectional view of a hydraulic valve and restrictor configuration used in the system of FIG. 1 showing a metering restriction valve 600 disposed in the drive fluid flow line that interconnects the directional valve and the upper fluid chamber of the piston, and showing a pressure sensor connected to the controller and disposed in and sensing the pressure of metered hydraulic drive fluid as it exits the metering restrictor valve 600 and flow toward the directional valve during the withdrawal or upstream-cycle of the actuator 941;

FIG. 2AAA is a schematic cross-sectional view of the FIG. 2A configuration showing the direction of flow of drive fluid during the closing or downstream-cycle of the actuator 941;

FIG. 5AA shows a plot corresponding to the velocity versus position plot of FIG. 5A of the metered pressure of drive fluid as sensed exiting metering restrictor valve 600 (in a configuration such as shown in FIG. 2A or 2C) versus upstream position of travel of the valve pin 1041 of actuator 941 beginning from a fully closed position at position zero where the;

FIG. 5AAA shows a plot also corresponding to the velocity versus position plot of FIG. 5A of the metered pressure of drive fluid as sensed exiting metering restrictor valve 600 (in a configuration such as shown in FIG. 2A or 2C) versus time of travel of the valve pin 1041 of actuator 941 beginning from a fully closed position at time zero;

FIG. 5BB shows a plot corresponding to the velocity versus position plot of FIG. 5B of the metered pressure of drive fluid as sensed exiting metering restrictor valve 600 (in a configuration such as shown in FIG. 2A or 2C) versus upstream position of travel of the valve pin 1041 of actuator 941 beginning from a fully closed position at position zero;

FIG. 5BBB shows a plot also corresponding to the velocity versus position plot of FIG. 5B of the metered pressure of drive fluid as sensed exiting metering restrictor valve 600 (in a configuration such as shown in FIG. 2A or 2C) versus time of travel of the valve pin 1041 of actuator 941 beginning from a fully closed position at time zero;

DETAILED DESCRIPTION

Figure 1:
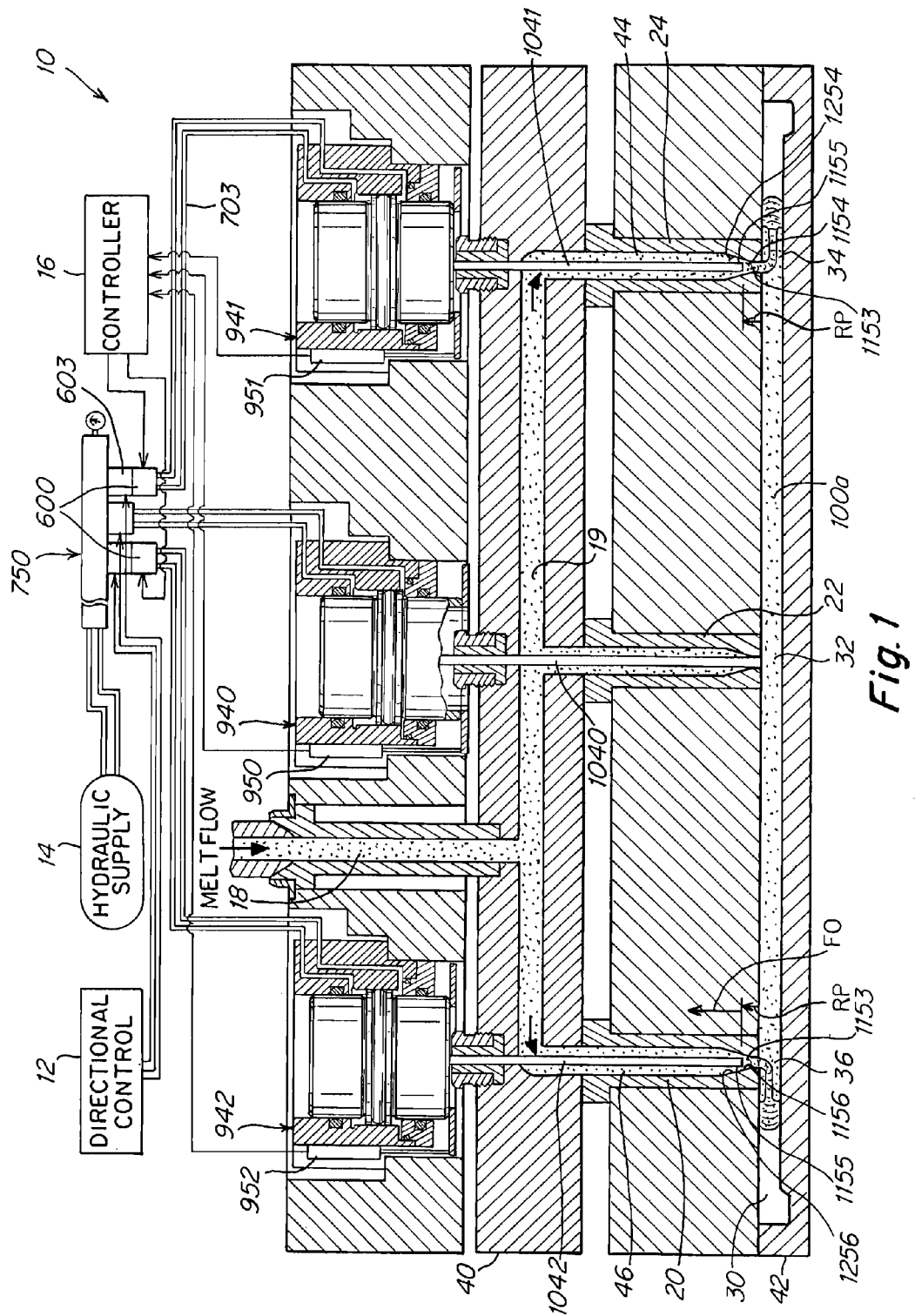
FIG. 1 is a schematic of one embodiment of the invention showing a pair of sequential gates showing a first gate entering the center of a cavity having been opened and shown closed such that a first shot of fluid material has entered the cavity and traveled past the position of a second sequential gate, the second gate shown being open with its valve pin having traveled along an upstream restricted flow path RP allowing a second sequential shot of fluid material to flow into and merge with the first shot of material within the cavity.

FIG. 1 shows a system 10 with a central nozzle 22 feeding molten material from an injection molding machine through a main inlet 18 to a distribution channel 19 of a manifold 40. The distribution channel 19 commonly feeds three separate nozzles 20, 22, 24 which all commonly feed into a common cavity 30 of a mold 42. One of the nozzles 22 is controlled by actuator 940 and arranged so as to feed into cavity 30 at an entrance point or gate that is disposed at about the center 32 of the cavity. As shown, a pair of lateral nozzles 20, 24 feed into the cavity 30 at gate locations that are distal 34, 36 to the center gate feed position 32.

Figure 1A:
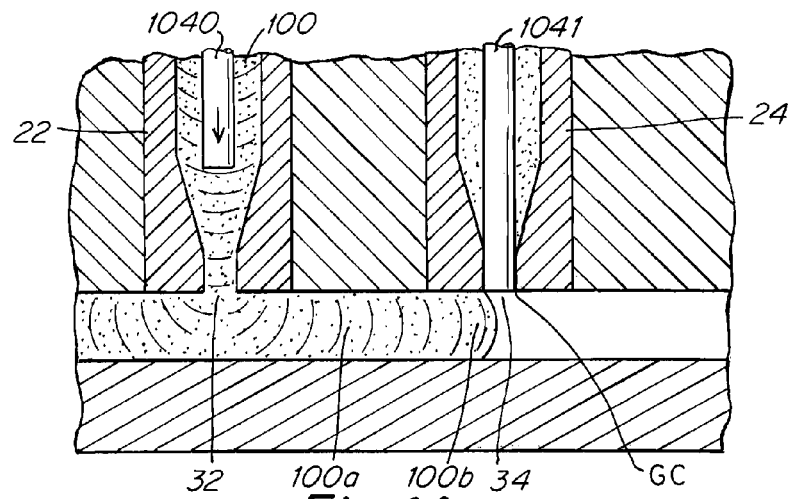
FIGS. 1A-1E are schematic cross-sectional close-up views of the center and one of the lateral gates of the FIG. 1 apparatus showing various stages of the progress of injection.
Figure 1B:
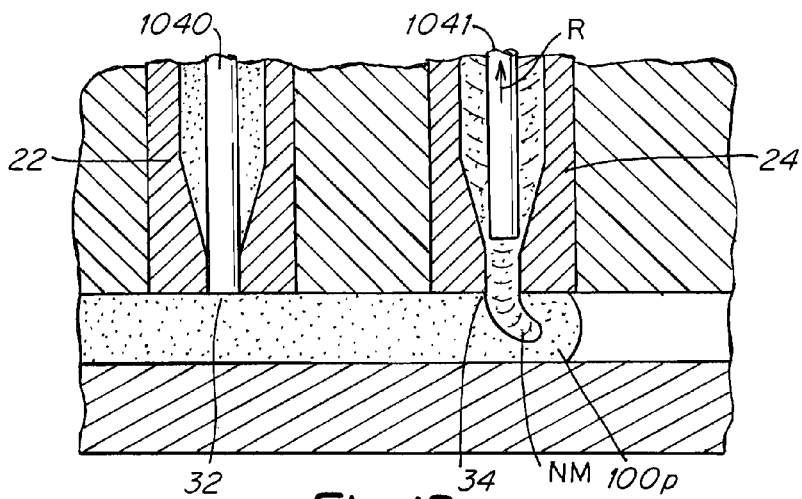
Figure 1C:
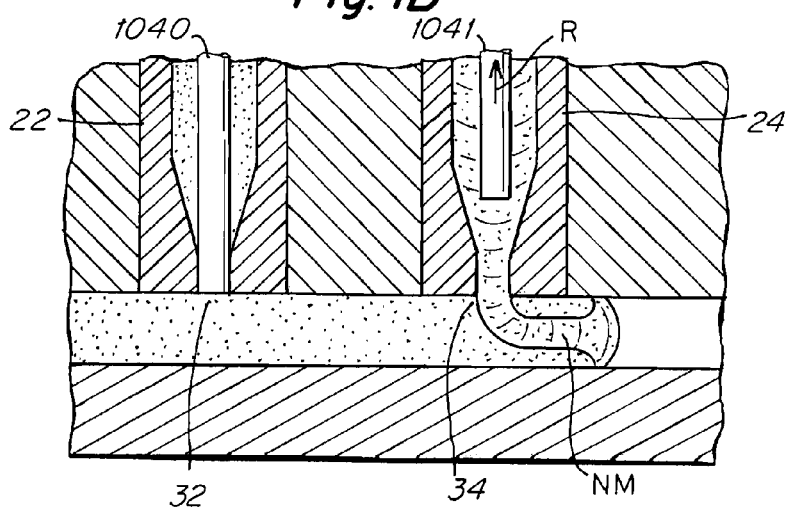

As shown in FIGS. 1, 1A the injection cycle is a cascade process where injection is effected in a sequence from the center nozzle 22 first and at a later predetermined time from the lateral nozzles 20, 24. As shown in FIG. 1A the injection cycle is started by first opening the pin 1040 of the center nozzle 22 and allowing the fluid material 100 (typically polymer or plastic material) to flow up to a position the cavity just before 100b the distally disposed entrance into the cavity 34, 36 of the gates of the lateral nozzles 24, 20 as shown in FIG. 1A. After an injection cycle is begun, the gate of the center injection nozzle 22 and pin 1040 is typically left open only for so long as to allow the fluid material 100b to travel to a position just past 100p the positions 34, 36. Once the fluid material has travelled just past 100p the lateral gate positions 34, 36, the center gate 32 of the center nozzle 22 is typically closed by pin 1040 as shown in FIGS. 1B, 1C, 1D and 1E. The lateral gates 34, 36 are then opened by upstream withdrawal of lateral nozzle pins 1041, 1042 as shown in FIGS. 1B-1E. As described below, the rate of upstream withdrawal or travel velocity of lateral pins 1041, 1042 is controlled as described below.

In alternative embodiments, the center gate 32 and associated actuator 940 and valve pin 1040 can remain open at, during and subsequent to the times that the lateral gates 34, 36 are opened such that fluid material flows into cavity 30 through both the center gate 32 and one or both of the lateral gates 34, 36 simultaneously.

When the lateral gates 34, 36 are opened and fluid material NM is allowed to first enter the mold cavity into the stream 102p that has been injected from center nozzle 22 past gates 34, 36, the two streams NM and 102p mix with each other. If the velocity of the fluid material NM is too high, such as often occurs when the flow velocity of injection fluid material through gates 34, 36 is at maximum, a visible line or defect in the mixing of the two streams 102p and NM will appear in the final cooled molded product at the areas where gates 34, 36 inject into the mold cavity. By injecting NM at a reduced flow rate for a relatively short period of time at the beginning when the gate 34, 36 is first opened and following the time when NM first enters the flow stream 102p, the appearance of a visible line or defect in the final molded product can be reduced or eliminated.

Figure 5A:
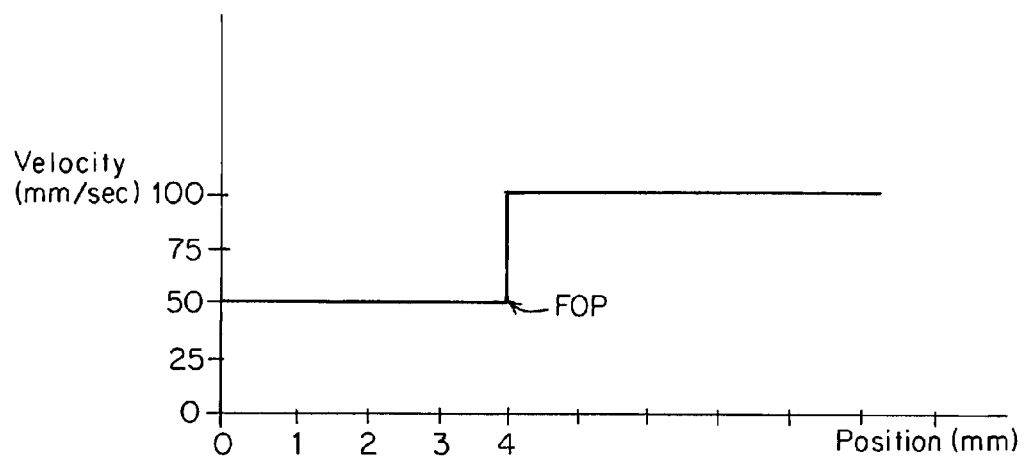
FIGS. 5A-5D are a series of plots of pin velocity versus position each plot representing a different example of the opening of a gate lateral to a central gate via continuous upstream withdrawal of a valve pin at one rate or set of rates over an initial flow path RP and at another higher rate or set of rates of upstream withdrawal of the valve pin beginning at a pin position of FOP and beyond when the fluid material flow is typically at a maximum unrestricted rate of flow through the open gate without any restriction or obstruction from the tip end of the pin.

The rate or velocity of upstream withdrawal of pins 1041, 1042 starting from the closed position is controlled via controller 16, FIGS. 1, 2 which controls the rate and direction of flow of hydraulic fluid from the drive system 700 to the actuators 940, 941, 942. As discussed in detail below, a predetermined profile of metered drive fluid pressure versus position of the valve pin or actuator piston (examples of which are shown in FIGS. 5AA, 5BB) or metered drive fluid pressure versus elapsed time (examples of which are shown in FIGS. 5AAA, 5BBB) is input into the controller as the basis for controlling withdrawal of the valve pin(s) 1041 et al. at a reduced velocity relative to one or more selected higher velocities of withdrawal. The higher velocity is typically selected to be the highest velocity at which the system is capable of driving the actuators. The controller 16 receives a signal in real time from a pressure sensor 603 (or 605, 607) disposed in the drive fluid line communicating with the exit of the metering valve 600, the signal being indicative of the reduced drive fluid pressure in line 703 (or 705, 707). The controller 16 instructs the valve 600 to move to a degree of openness that causes the fluid pressure in the line to match the pressure of the predetermined profile at any given point in time or pin position along the pressure versus time profile (e.g. FIG. 5AAA or 5BBB) or pressure versus position profile (FIG. 5AA or 5BB. The pressure in the exit line of the metering valve 600 is proportional and corresponds to the velocity of withdrawal movement of the actuator 941 (940, 942) and associated valve pin 1041 (1040, 1042).

A "controller," as used herein, refers to electrical and electronic control apparati that comprise a single box or multiple boxes (typically interconnected and communicating with each other) that contain(s) all of the separate electronic processing, memory and electrical signal generating components that are necessary or desirable for carrying out and constructing the methods, functions and apparatuses described herein. Such electronic and electrical components include programs, microprocessors, computers, PID controllers, voltage regulators, current regulators, circuit boards, motors, batteries and instructions for controlling any variable element discussed herein such as length of time, degree of electrical signal output and the like. For example a component of a controller, as that term is used herein, includes programs, controllers and the like that perform functions such as monitoring, alerting and initiating an injection molding cycle including a control device that is used as a standalone device for performing conventional functions such as signaling and instructing an individual injection valve or a series of interdependent valves to start an injection, namely move an actuator and associated valve pin from a gate closed to a gate open position. In addition, although fluid driven actuators are employed in typical or preferred embodiments of the invention, actuators powered by an electric or electronic motor or drive source can alternatively be used as the actuator component.

Figure 2A:
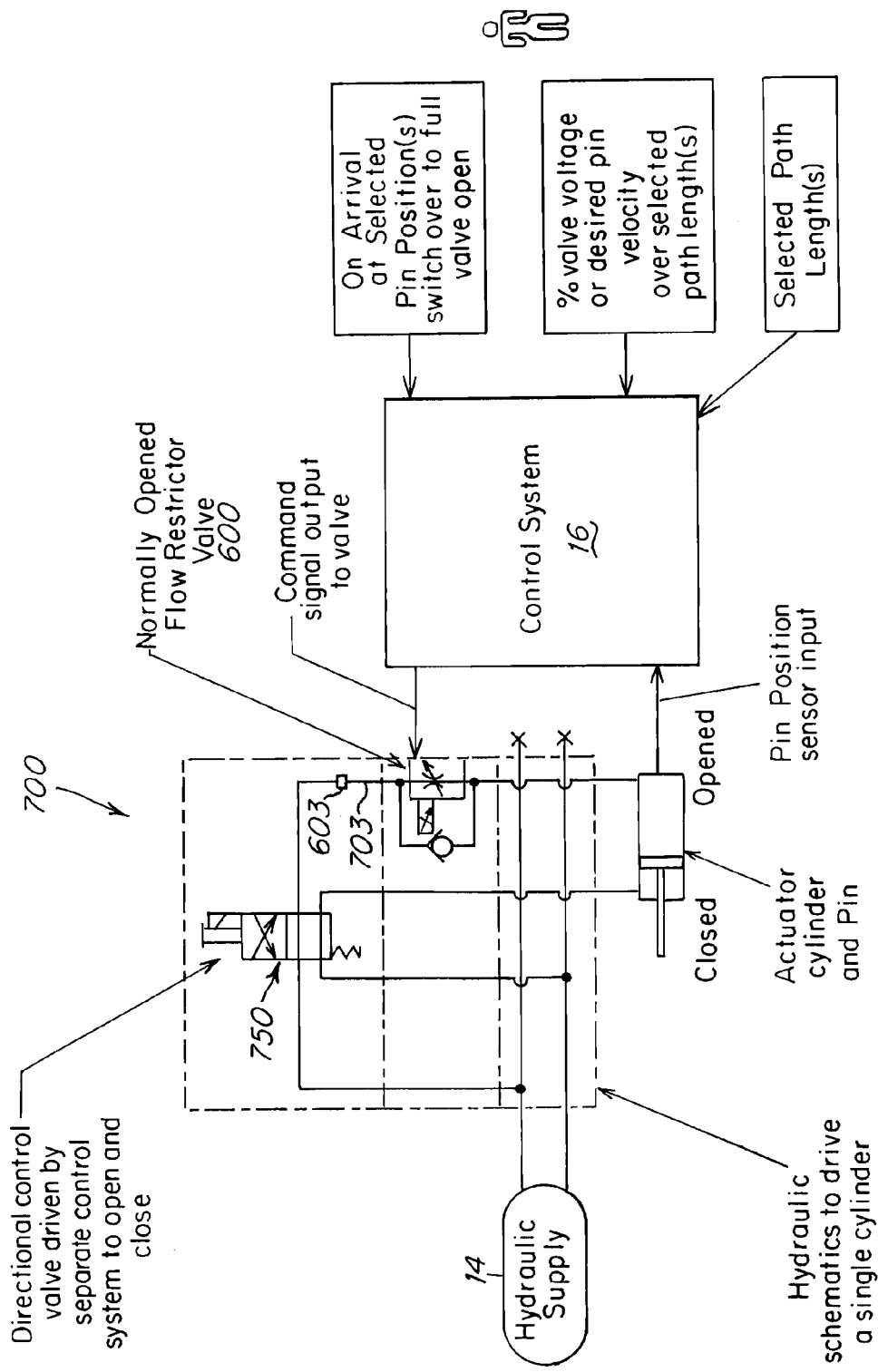
FIG. 2A is a schematic of one embodiment of the invention showing generically a hydraulically actuated valve pin in which at least one port of the actuator is connected to a flow restrictor 600 so as to restrict the flow of hydraulic drive fluid and slow the opening of the valve pin by a selected lessening of pin opening velocity by use of a controller interconnected to the flow restrictor, the controller enabling the user to select a percentage of predetermined full open position velocity that the hydraulic drive supply to the actuator normally operates at full open velocity drive fluid pressure, the controller instructing the restrictor valve to operate at less than full open velocity up until the valve pin reaches a predetermined upstream position at which point a position sensor signals the controller and the controller instructs the restrictor valve to open to a full open full velocity degree of openness position.
Figure 2A:
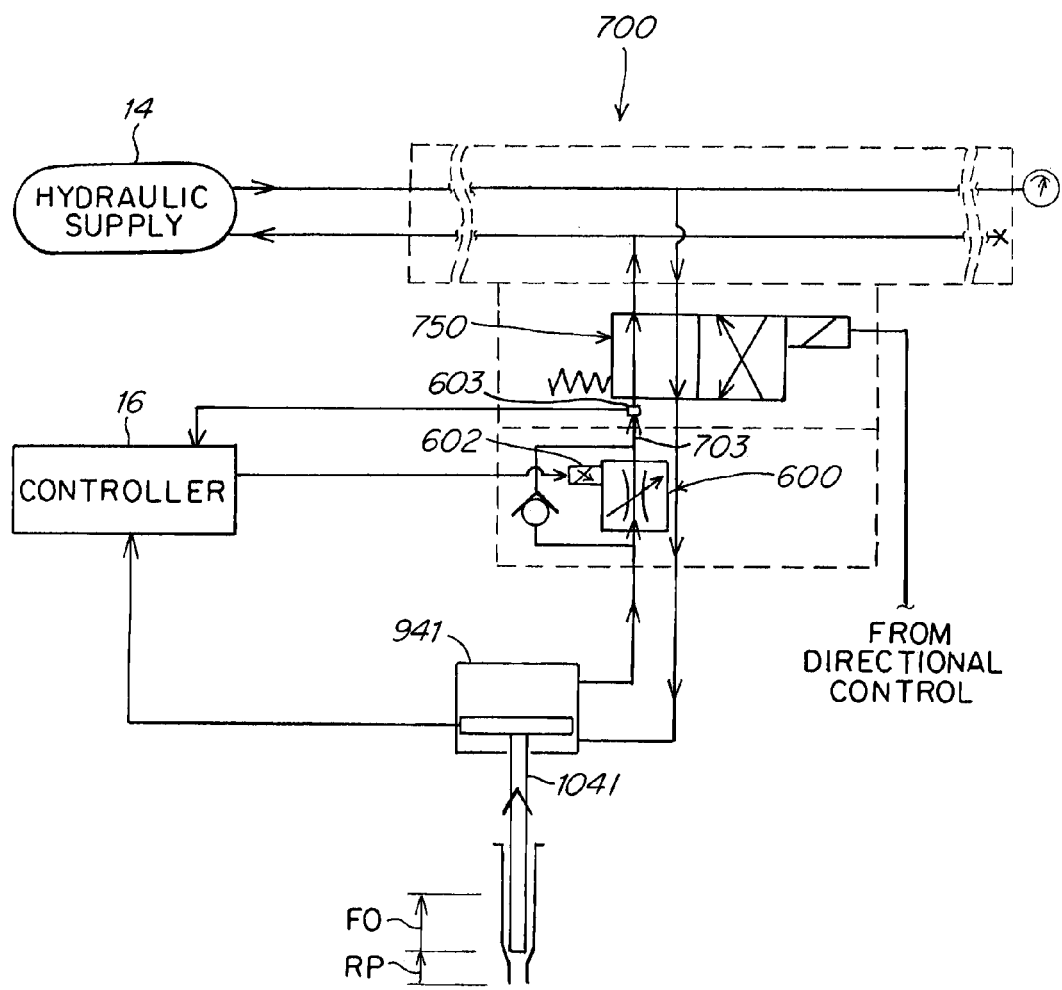
Figure 2B:
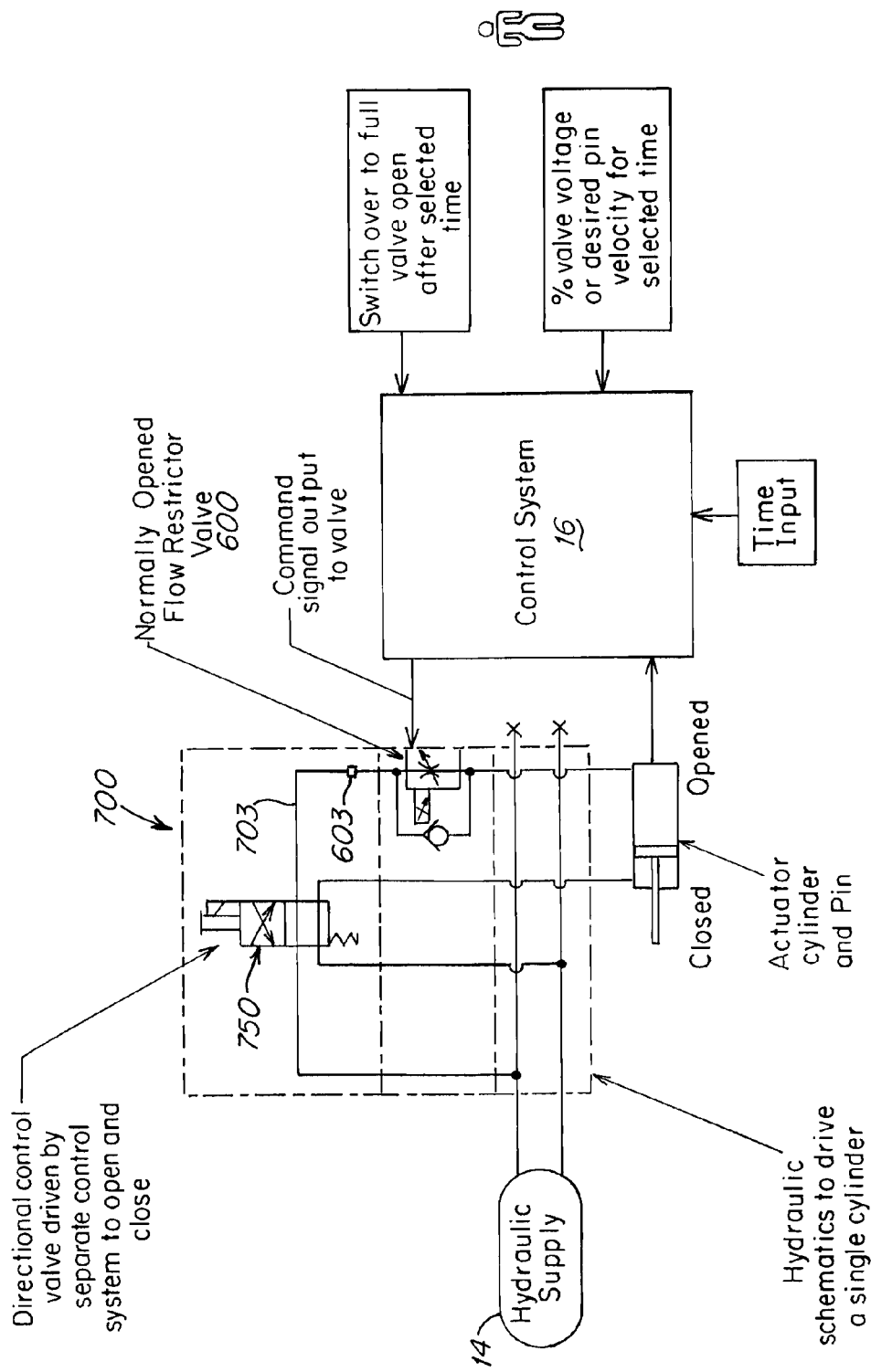
FIG. 2B is a schematic of an alternative embodiment to the FIG. 2A system showing generically a hydraulically actuated valve and its interconnection to the hydraulic system and the control system for operating the restrictor valve 600 to cause the valve pin to withdraw at the beginning of a cycle at a predetermined reduced velocity for a predetermined amount of time subsequent to which the control system instructs the restrictor valve to open to a full open full velocity degree of openness position.
Figure 2C:
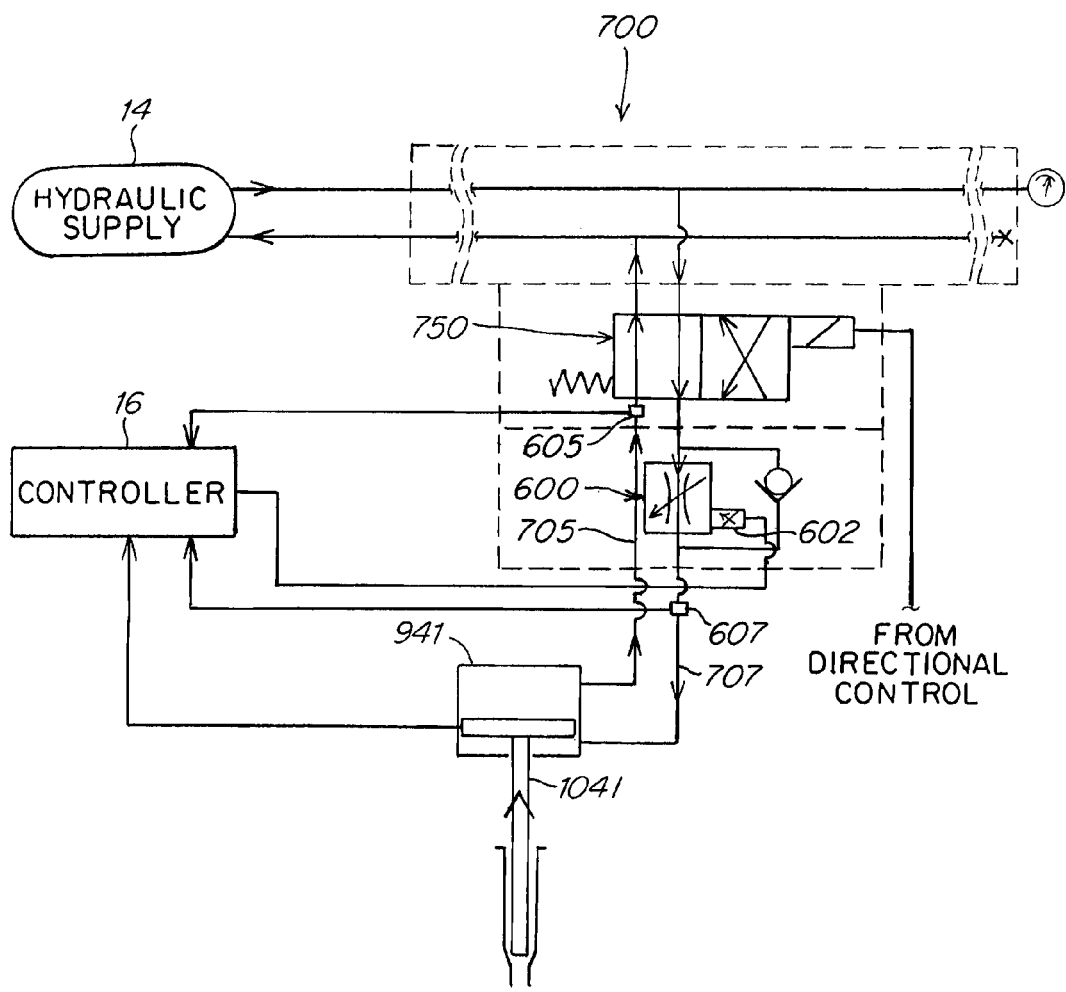
FIG. 2C is a schematic cross-sectional view of another hydraulic valve and restrictor configuration that can be used in the system of FIG. 2A or 2B showing the metering restrictor valve 600 disposed in the drive fluid flow line that interconnects the directional valve and the lower piston fluid chamber and further showing alternative possible locations for placement of a pressure sensor connected to the controller, the sensor sensing drive fluid after the drive fluid exits the metering flow valve 600, one alternative being disposition of the sensor in the drive fluid line between the exit of the metering flow valve and the entry port to the lower fluid chamber of the piston, another alternative being disposition of the sensor between the exit port of the upper drive fluid chamber of the piston and the directional valve.

As shown in FIGS. 2A-2AAA, 2B, a supply of hydraulic fluid 14 is fed first through a directional control valve 750 mechanism that switches the hydraulic fluid flow to the actuator cylinders in either of two directions: fluid out to withdraw the pin upstream, FIG. 2A, 2AA and fluid in to drive the pin downstream, FIG. 2AAA. At the beginning of an injection cycle the gate of a lateral valve 34, 36 is closed and the hydraulic system is in the directional configuration of FIG. 2AAA. When a cycle is started, the directional configuration of the directional valve 750 of the hydraulic system 700 is switched by controller 16 to the configuration of FIG. 2A or 2AA. The hydraulic system includes a flow restriction valve 600 that is controlled by controller 16 to vary the rate of flow of hydraulic fluid to the actuator 941, 951 to vary the rate of travel of the actuator 941/valve pin 1041 upstream according to a predetermined pressure profile (e.g. FIGS. 5AA, 5AAA, 5BB, 5BBB) or to drive the actuator 941/valve pin 1041 downstream. Although not shown in FIGS. 2A, 2B, the controller 16 and hydraulic system 700 can control the direction and rate of travel of the pistons of actuators 940 and 942 in a manner similar to the manner of control of actuator 941 via the connections shown in FIG. 1.

The user programs controller 16 via data inputs on a user interface to instruct the hydraulic system 700 via control of the degree of openness of the restriction valve 600 to drive pins 1041, 1042 at an upstream velocity of travel that is reduced relative to a maximum velocity that the hydraulic system 700 can drive the pins 1041, 1042 to travel. The reduced velocity at which the actuator 941 and associated valve pin 1041 are driven is determined by a predetermined profile of reduced drive fluid pressures that is followed by the controller 16 based on the metered pressure exiting valve 600 that is sensed by sensor 603 in line 703 and sent to the controller 16 during an injection cycle, the controller 16 controlling the degree of openness of valve 600 which in turn controls the degree of pressure exiting valve 600 in line 703.

As described below, the controller 16 drives the actuator 941/valve pin 1041 at the profile of reduced pin withdrawal rate or velocity either until a position sensor such as 951, 952 detects that an actuator 941, 952 or an associated valve pin (or another component), has reached a certain position (e.g. as in FIGS. 5AA, 5BB) as sensed by the position sensor 951, 952 such as at the end point COP, COP2, FIGS. 3B, 4B of a restricted flow path RP, RP2, In an alternative embodiment, the user can program controller 16 via to instruct the hydraulic system 700 to drive pins 1041, 1042 at the profile of reduced velocity of upstream travel for a predetermined amount of time. In such an embodiment, the reduced pin withdrawal rate or velocity is executed for a preselected amount of time that is less than the time of the entire injection cycle, the latter part of the injection cycle being executed with the pins 1041, 1042 being withdrawn at a higher velocity typically the highest velocity at which the hydraulic system is capable of driving the pins 1041, 1042. A typical amount of time over which the pins are instructed to withdraw at a reduced velocity is between about 0.25 and about 10 seconds, more typically between about 0.5 and about 5 seconds, the entire injection cycle time typically being between about 4 seconds and about 30 seconds, more typically between about 6 seconds and about 12 seconds. In such an embodiment, the periods of time over which the pins 1041, 1042 are withdrawn at reduced velocities are typically determined empirically by trial and error runs. One or more, typically multiple, trial injection cycle runs are carried out to make specimen parts from the mold. Each trial injection cycle run is carried out using a different period or periods of time at which the pins 1041, 1042 are withdrawn at one or more reduced velocities over the trial period(s) of time, and the quality of the parts produced from all such trial runs are compared to determine the optimum quality producing time(s) of reduced velocity pin withdrawals. When the optimum time(s) have been determined, the controller is programmed to carry out an injection cycle where the pin withdrawal velocities of pins 1041 are reduced for the predetermined amounts of time at the predetermined reduced withdrawal rates.

FIG. 1 shows position sensors 950, 951, 952 for sensing the position of the actuator cylinders 941, 942, 952 and their associated valve pins (such as 1041, 1042, 1052) and feed such position information to controller 16 for monitoring purposes. As shown, fluid material 18 is injected from an injection machine into a manifold runner 19 and further downstream into the bores 44, 46 of the lateral nozzles 24, 22 and ultimately downstream through the gates 32, 34, 36.

Figure 1D:
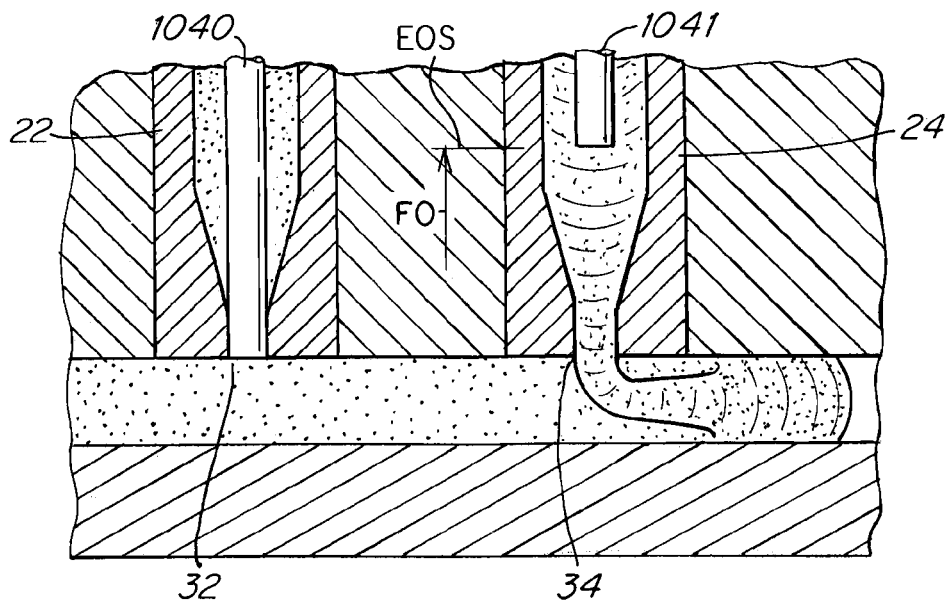
Figure 1E:
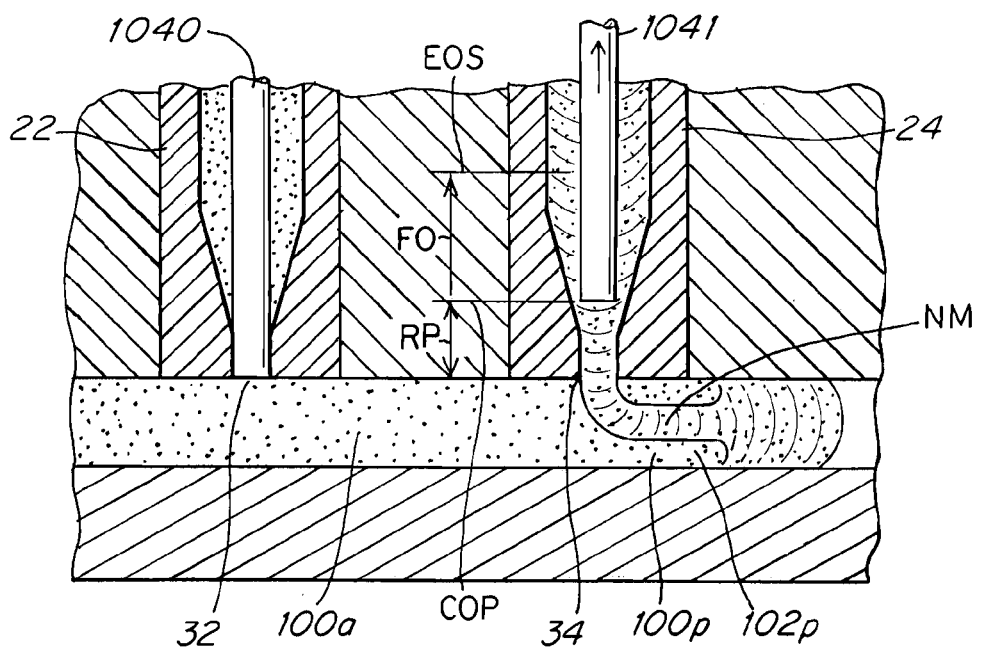

When the pins 1041, 1042 are withdrawn upstream to a position where the tip end of the pins 1041 are in a fully upstream open position such as shown in FIG. 1D, the rate of flow of fluid material through the gates 34, 36 is at a maximum. However when the pins 1041, 1042 are initially withdrawn beginning from the closed gate position, FIG. 1A, to intermediate upstream positions, FIGS. 1B, 1C, a gap 1154, 1156 that restricts the velocity of fluid material flow is formed between the outer surfaces 1155 of the tip end of the pins 44, 46 and the inner surfaces 1254, 1256 of the gate areas of the nozzles 24, 20. The restricted flow gap 1154, 1156 remains small enough to restrict and reduce the rate of flow of fluid material 1153 through gates 34, 36 to a rate that is less than maximum flow velocity over a travel distance RP of the tip end of the pins 1041, 1042 going from closed to upstream as shown in FIGS. 1, 1B, 1C, 1E and 3B, 4B.

The pins 1041 can be controllably withdrawn at one or more reduced velocities (less than maximum) for one or more periods of time over the entirety of the length of the path RP over which flow of mold material 1153 is restricted. Preferably the pins are withdrawn at a reduced velocity over more than about 50% of RP and most preferably over more than about 75% of the length RP. As described below with reference to FIGS. 3B, 4B, the pins 1041 can be withdrawn at a higher or maximum velocity at the end COP2 of a less than complete restricted mold material flow path RP2.

The trace or visible lines that appear in the body of a part that is ultimately formed within the cavity of the mold on cooling above can be reduced or eliminated by reducing or controlling the velocity of the pin 1041, 1042 opening or upstream withdrawal from the gate closed position to a selected intermediate upstream gate open position that is preferably 75% or more of the length of RP.

RP can be about 1-8 mm in length and more typically about 2-6 mm and even more typically 2-4 mm in length. As shown in FIG. 2 in such an embodiment, a control system or controller 16 is preprogrammed to control the sequence and the rates of valve pin 1040, 1041, 1042 opening and closing. The controller 16 controls the rate of travel, namely velocity of upstream travel, of a valve pin 1041, 1042 from its gate closed position for at least the predetermined amount of time that is selected to withdraw the pin at the selected reduced velocity rate.

The velocity of withdrawal of the valve pins 1041, 1042 is determined by regulation of the flow of hydraulic drive fluid that is pumped from a supply 14 to the actuators 941, 942 through flow restrictor valve 600, FIGS. 1, 2, 2A, 2B. When the flow restrictor valve 600 is completely open, namely 100% open, allowing maximum flow of the pressurized hydraulic fluid to the actuator cylinders, the valve pins 1041, 1042 are driven at a maximum upstream travel velocity.

According to the invention, the degree of openness of the flow restrictor valve 600 is adjusted in response to sensing with sensor 603 of the drive fluid pressure that exits restrictor valve 600. The controller automatically adjusts the degree of openness of flow restrictor valve 600 to less than 100% open to cause the reduced pressure in line 703 to match and follow the predetermined profile of pressure shown for example in FIGS. 5AA, 5AAA, 5BB, 5BBB which in turn adjusts rate and volume flow of pressurized hydraulic fluid to the actuator cylinders which in turn adjusts the velocity of upstream travel of the pins 1041, 1042 according to the predetermined exit pressure in line 703 for either a selected period of time as in FIG. 5AAA or 5BBB or until the actuator/valve pin has travelled upstream to a predetermined position as in FIGS. 5AA, 5BB, the predetermined upstream position being sensed by a position sensor 951, 952, 950 and signalling controller 16. Upon expiration of the predetermined amount of time (FIGS. 5AAA, 5BBB) or upon reaching the predetermined upstream position (FIGS. 5AA, 5BB), the controller 16 instructs the metering valve to open to a greater degree of openness to drive the actuator 941/pin 1041 at a higher velocity typically to the highest degree of openness of the valve 600 and thus the highest possible velocity.

In the FIGS. 5AA, 5BB embodiment, the actuator/valve pin travels the predetermined length of the reduced velocity path RP, RP2, at the end of which the position sensor signals the controller 16 whereby the controller 16 determines that the end COP, COP2 has been reached and the valve 600 is opened to a higher velocity, typically to its 100% open position to allow the actuator pistons and the valve pins 1041, 1042 to be driven at maximum upstream velocity FOV in order to reduce the cycle time of the injection cycle.

The valve 600 typically comprises a restrictor valve that is controllably positionable anywhere between completely closed (0% open) and completely open (100% open). Adjustment of the position of the restrictor valve 600 is typically accomplished via a source of electrical power that controllably drives an electromechanical mechanism that causes the valve to rotate such as a rotating spool that reacts to a magnetic or electromagnetic field created by the electrical signal output of the controller 16, namely an output of electrical energy, electrical power, voltage, current or amperage the degree or amount of which can be readily and controllably varied by conventional electrical output devices. The electro-mechanism is controllably drivable to cause the valve 600 to open or close to a degree of openness that is proportional to the amount or degree of electrical energy that is input to drive the electro-mechanism. The velocity of upstream withdrawal travel of the pins 1041, 1042 are in turn proportional to the degree of openness of the valve 600. Thus the rate of upstream travel of the pins 1041, 1042 is proportional to the amount or degree of electrical energy that is input to the electro-mechanism drives valves 600. The electro-mechanism that is selected for driving the valve 600 establishes in the first instance the maximum amount of electrical energy or power (such as voltage or current) that is required to open the valve to its 100% open position.

The user implements a reduced upstream velocity of the pins 1041, 1042 over a given upstream length of travel or over a given amount of time by inputting to the controller 16 a profile of reduced exit fluid pressures that are implemented by adjusting the electrical drive mechanism that operates metering valve 600 to less than 100% of the maximum amount of electrical energy or power input (voltage or current) needed to open the valve 600 to 100% open at which setting maximum drive fluid pressure and, a fortiori, maximum actuator/pin velocity occurs.

In one embodiment, the user can implement reduced actuator/pin withdrawal velocity profiles by inputting reduced exit pressure profiles (or other data corresponding thereto) versus actuator/pin position into the controller 16. Exit pressure is the pressure of the valve drive fluid that exits the metering valve 600 during the upstream withdrawal portion of the injection cycle. In the examples provided, the exit pressure would be the pressure in one of lines 703, 705 or 707 as sensed by a respective one of sensors 603, 605, 607. In another embodiment, the user can implement reduced actuator/pin withdrawal velocity profiles by inputting to the controller 16 reduced exit pressure profiles or other data corresponding.thereto) versus time of withdrawal beginning from the time at which the gate is closed.

The user can also preselect the length of the path of travel RP, RP2 of the valve pin or other end of reduced velocity position of the valve pin or other component over the course of travel of which the material flow through the gate is restricted and input such selections into the controller 16. In an alternative embodiment the user can preselect the length of time during which the gate is restricted by a valve pin travelling over a restricted path length RP, RP2 and input such a selection into the controller 16.

The controller 16 includes conventional programming or circuitry that receives and executes the user inputs. The controller may include programming or circuitry that enables the user to input as a variable a selected pin velocity rather than a percentage of electrical output, the programming of the controller 16 automatically converting the inputs by the user to appropriate instructions for reduced energy input to the electro-mechanism that drives the valve 600.

Typically the user selects a profile of metered exit drive fluid pressures that corresponds to reduced pin withdrawal velocities that are less than about 90% of the maximum velocity (namely the velocity when the valve 600 is fully open), more typically less than about 75% of the maximum velocity and even more typically less than about 50% of the maximum velocity at which the pins 1041, 1042 are drivable by the hydraulic system. The actual maximum velocity at which the actuators 941, 942 and their associated pins 1041, 1042 are driven is predetermined by selection of the size and configuration of the actuators 941, 942, the size and configuration of the restriction valve 600 and the degree of pressurization and type of hydraulic drive fluid selected for use by the user. The maximum drive rate of the hydraulic system is predetermined by the manufacturer and the user of the system and is typically selected according to the application, size and nature of the mold and the injection molded part to be fabricated.

As shown by the series of examples of programs illustrated in FIGS. 5A, 5B, 5c, 5D one or more profiles of reduced pin withdrawal velocity can be selected and the pin driven by restricted hydraulic fluid flow between the gate closed (X and Y axis zero position) and the final intermediate upstream open gate position (4 mm for example in the FIG. 5A example, 5 mm in the FIG. 5B example) at which point the controller 16 in response to position sensing instructs the drive system to drive pin 1041, 1042 to travel upstream at a higher, typically maximum, upstream travel velocity (as shown, 100 mm/sec in the FIGS. 5A-5D examples). In the FIGS. 5A, 5B examples, the profile of reduced pin velocity is selected as being about 50, 25 and 75 mm/sec over the initial reduced velocity path length. In practice the velocity of the pin may or may not be precisely known, the Y velocity axis of FIGS. 5A, 5B corresponding to the drive fluid pressure profile of FIGS. 5AA, 5AAA, 5BB, 5BBB, the degree of precision in control over which depends and may vary slightly with the degree of precision in control over the opening of the flow restriction valve 600, 100 mm/sec corresponding to the valve 600 being completely 100% open (and pin being driven at maximum velocity); and 50 mm/sec corresponding to 50% electrical energy input to the electromechanism that drives the restriction valve 600 to one-half of its maximum 100% degree of openness. In the FIG. 5A example, the path length RP over which the valve pin 1041, 1042 travels at the reduced 50 mm/sec velocity is 4 mm. After the pin 1041, 1042 has been driven to the upstream position COP position of about 4 mm from the gate closed GC position, the controller 16 instructs the electro-mechanism that drives the valve 600 (typically a magnetic or electromagnetic field driven device such as a spool) to open the restrictor valve 600 to full 100% open at which time the pin (and its associated actuator piston) are driven by the hydraulic system at the maximum travel rate 100 mm/sec for the predetermined, given pressurized hydraulic system.

Figure 5B:
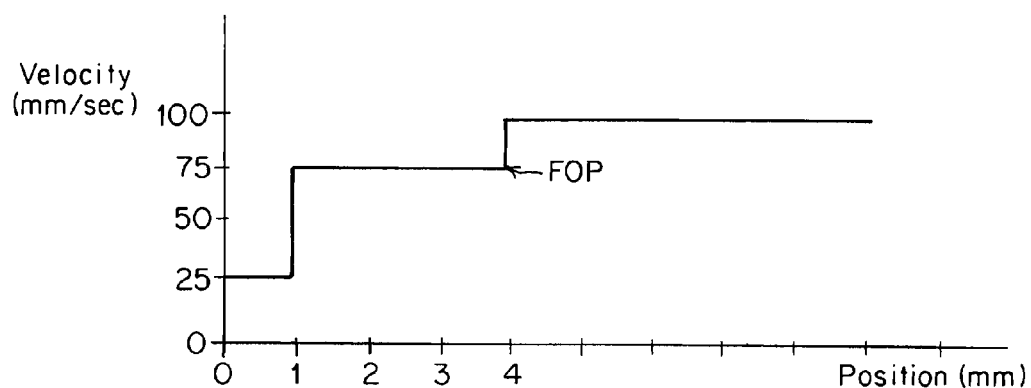
Figure 5C:
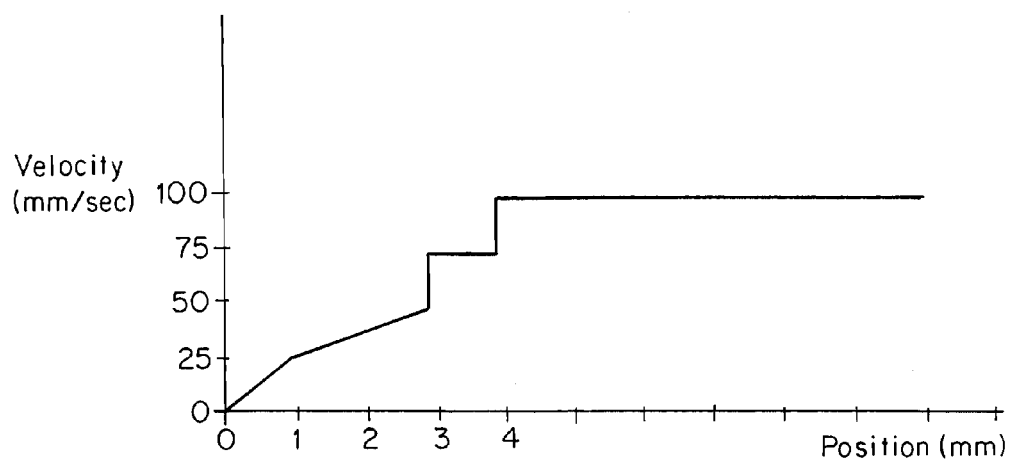
Figure 5D:
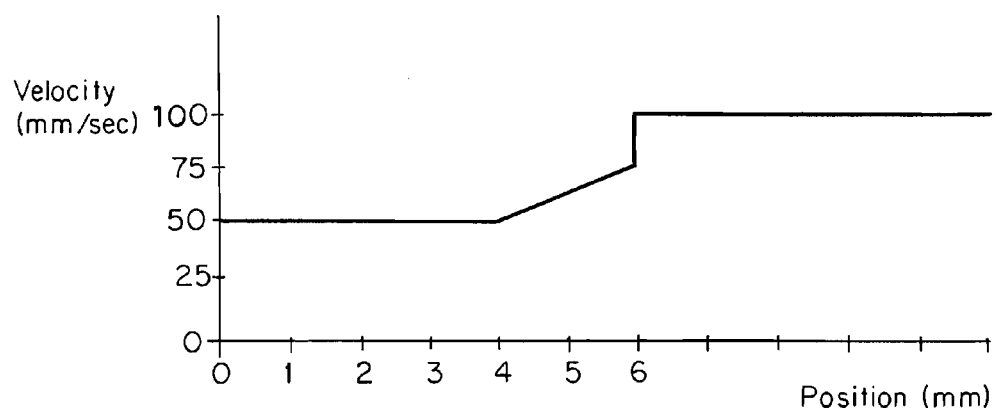

FIGS. 5B-5D illustrate a variety of alternative profiles for driving the pin 1041, 1042 at reduced velocities for various durations of time. For example as shown in FIG. 5B, the pin is driven for 0.02 seconds at 25 mm/sec, then for 0.06 seconds at 75 mm/sec and then allowed to go to full valve open velocity shown as 100 mm/sec. Full valve open or maximum velocity is typically determined by the nature of hydraulic (or pneumatic) valve or motor drive system that drives the valve pin. In the case of a hydraulic (or pneumatic) system the maximum velocity that the system is capable of implementing is determined by the nature, design and size of the pumps, the fluid delivery channels, the actuator, the drive fluid (liquid or gas), the restrictor valves and the like.

As shown in FIGS. 5A-5D, the velocity of the valve pin when the pin reaches the end of the reduced velocity period, the valve 600 can be instructed to assume the full open position essentially instantaneously or alternatively can be instructed to take a more gradual approach up, between 0.08 and 0.12 seconds, to the maximum valve openness as shown in FIG. 5D. In all cases the controller 16 instructs the valve pin 1041, 1042 to travel continuously upstream rather than follow a drive fluid pressure profile where the pin might travel in a downstream direction during the course of the injection cycle. Most preferably, the actuator, valve pin, valves and fluid drive system are adapted to move the valve pin between a gate closed position and a maximum upstream travel position that defines an end of stroke position for the actuator and the valve pin. Most preferably the valve pin is moved at the maximum velocity at one or more times or positions over the course of upstream travel of the valve pin past the upstream gate open position. Alternatively to the hydraulic system depicted and described, a pneumatic or gas driven system can be used and implemented in the same manner as described above for a hydraulic system.

Figures 3A, 3B:
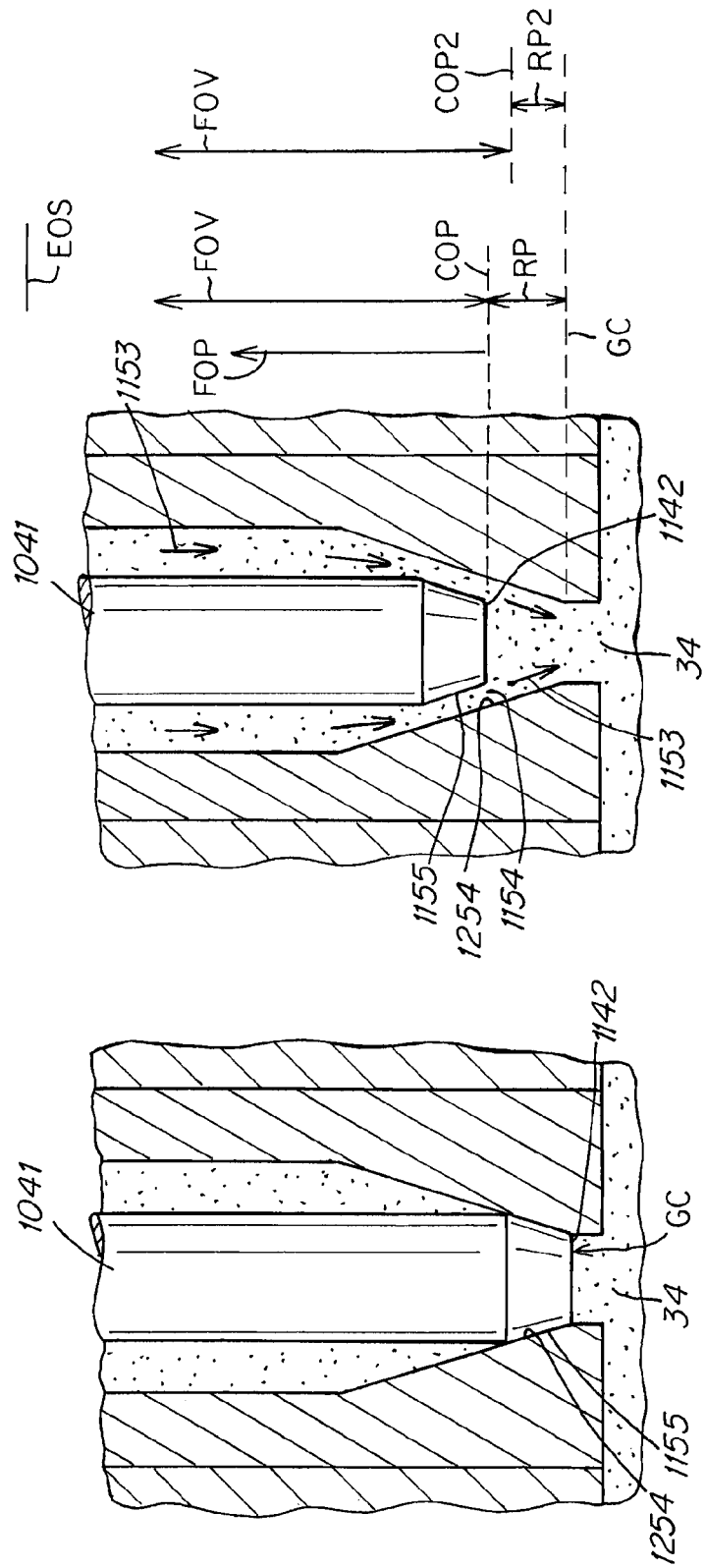
FIGS. 3A-3B show tapered end valve pin positions at various times and positions between a starting closed position as in FIG. 3A and various upstream opened positions, RP representing a selectable path length over which the velocity of withdrawal of the pin upstream from the gate closed position to an open position is reduced (via a controllable flow restrictor) relative to the velocity of upstream movement that the valve pin would normally have over the uncontrolled velocity path FOV when the hydraulic pressure is normally at full pressure and pin velocity is at its maximum.
Figure 4B:
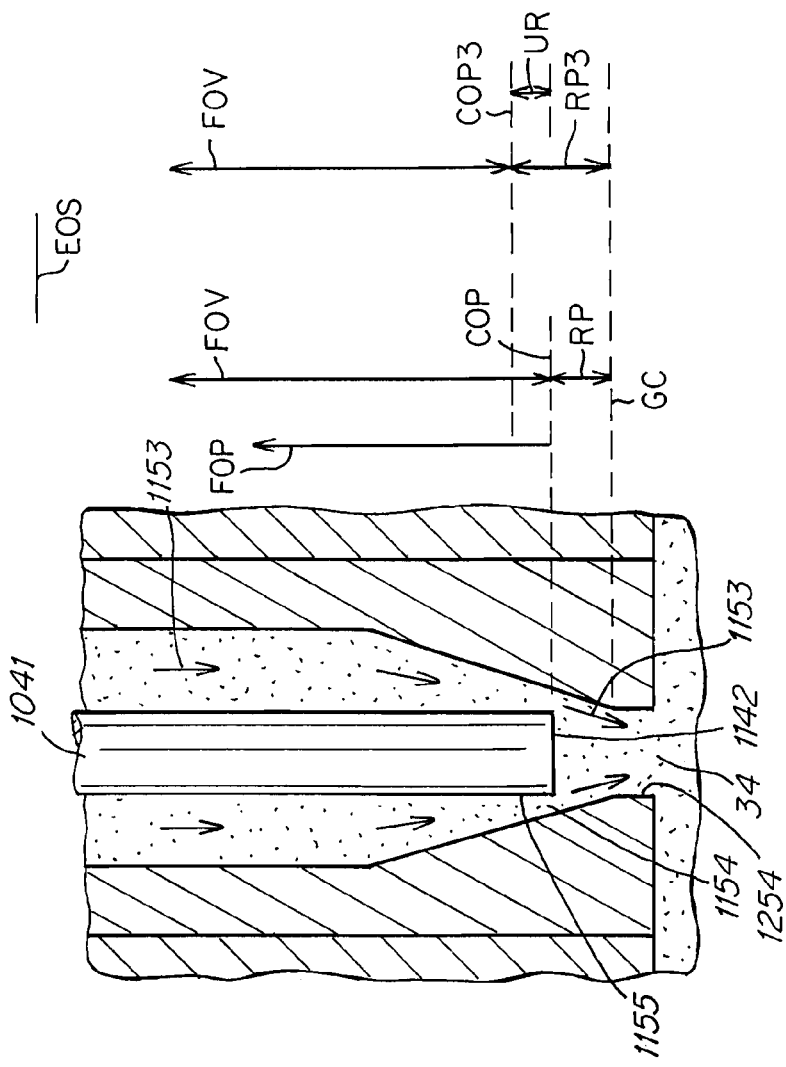
FIGS. 4A-4B show a system having a valve pin that has a cylindrically configured tip end, the tips ends of the pins being positioned at various times and positions between a starting closed position as in FIG. 4A and various upstream opened positions, RP wherein RP represents a path of selectable length over which the velocity of withdrawal of the pin upstream from the gate closed position to an open position is reduced (via a controllable flow restrictor or electric actuator) relative to the velocity of upstream movement that the valve pin would normally have over the uncontrolled velocity path FOV when the hydraulic pressure of a hydraulic actuator is normally at full pressure and pin velocity is at its maximum.
Figure 4A:
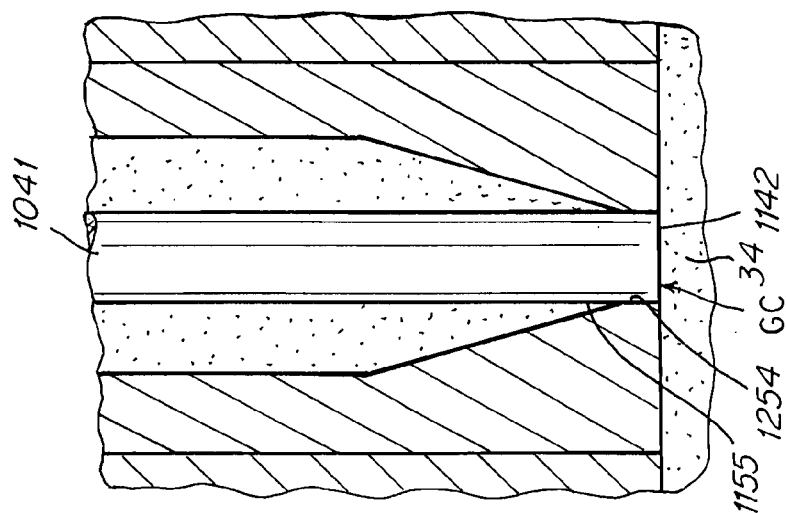

Preferably, the valve pin and the gate are configured or adapted to cooperate with each other to restrict and vary the rate of flow of fluid material 1153, FIGS. 3A-3B, 4A-4B over the course of travel of the tip end of the valve pin through the restricted velocity path RP. Most typically as shown in FIGS. 3A, 3B the radial tip end surface 1155 of the end 1142 of pin 1041, 1042 is conical or tapered and the surface of the gate 1254 with which pin surface 1155 is intended to mate to close the gate 34 is complementary in conical or taper configuration. Alternatively as shown in FIGS. 4A, 4B, the radial surface 1155 of the tip end 1142 of the pin 1041, 1042 can be cylindrical in configuration and the gate can have a complementary cylindrical surface 1254 with which the tip end surface 1155 mates to close the gate 34 when the pin 1041 is in the downstream gate closed position. In any embodiment, the outside radial surface 1155 of the tip end 1142 of the pin 1041 creates restricted a restricted flow channel 1154 over the length of travel of the tip end 1142 through and along restricted flow path RP that restricts or reduces the volume or rate of flow of fluid material 1153 relative to the rate of flow when the pin 1041, 1042 is at a full gate open position, namely when the tip end 1142 of the pin 1041 has travelled to or beyond the length of the restricted flow path RP (which is, for example the 4 mm upstream travel position of FIGS. 5A-5C).

In one embodiment, as the tip end 1142 of the pin 1041 continues to travel upstream from the gate closed GC position (as shown for example in FIGS. 3A, 4A) through the length of the RP path (namely the path travelled for the predetermined amount of time), the rate of material fluid flow 1153 through restriction gap 1154 through the gate 34 into the cavity 30 continues to increase from 0 at gate closed GC position to a maximum flow rate when the tip end 1142 of the pin reaches a position FOP (full open position), FIGS. 5A-5D, where the pin is no longer restricting flow of injection mold material through the gate. In such an embodiment, at the expiration of the predetermined amount of time when the pin tip 1142 reaches the FOP (full open) position FIGS. 5A, 5B, the pin 1041 is immediately driven by the hydraulic system at maximum velocity FOV (full open velocity) typically such that the restriction valve 600 is opened to full 100% open.

In embodiments, where the tip 1142 has reached the end of restricted flow path RP2 and the tip 1142 is not necessarily in a position where the fluid flow 1153 is not still being restricted, the fluid flow 1153 can still be restricted to less than maximum flow when the pin has reached the changeover position COP2 where the pin 1041 is driven at a higher, typically maximum, upstream velocity FOV. In the examples shown in the FIGS. 3B, 4B examples, when the pin has travelled the predetermined path length at reduced velocity and the tip end 1142 has reached the changeover point COP, the tip end 1142 of the pin 1041 (and its radial surface 1155) no longer restricts the rate of flow of fluid material 1153 through the gap 1154 because the gap 1154 has increased to a size that no longer restricts fluid flow 1153 below the maximum flow rate of material 1153. Thus in one of the examples shown in FIG. 3B the maximum fluid flow rate for injection material 1153 is reached at the upstream position COP of the tip end 1142. In another example shown in FIG. 3B 4B, the pin 1041 can be driven at a reduced velocity over a shorter path RP2 that is less than the entire length of the restricted mold material flow path RP and switched over at the end COP2 of the shorter restricted path RP2 to a higher or maximum velocity FOV. In the FIGS. 5A, 5B examples, the upstream FOP position is about 4 mm and 5 mm respectively upstream from the gate closed position. Other alternative upstream FOP positions are shown in FIGS. 5C, 5D.

In another alternative embodiment, shown in FIG. 4B, the pin 1041 can be driven and instructed to be driven at reduced or less than maximum velocity over a longer path length RP3 having an upstream portion UR where the flow of injection fluid mold material is not restricted but flows at a maximum rate through the gate 34 for the given injection mold system. In this FIG. 4B example the velocity or drive rate of the pin 1041 is not changed over until the tip end of the pin 1041 or actuator 941 has reached the changeover position COP3. In this embodiment, a position sensor senses either that the valve pin 1041 or an associated component has travelled the path length RP3 or reached the end COP3 of the selected path length and the controller receives and processes such information and instructs the drive system to drive the pin 1041 at a higher, typically maximum velocity upstream. In another alternative embodiment, the pin 1041 can be driven at a less than maximum velocity throughout the entirety of the travel path of the pin during an injection cycle from the gate closed position GC up to the end-of-stroke EOS position, the controller 16 being programmed to instruct the drive system for the actuator to be driven at one reduced velocity for an initial path length or period of time and at another less than maximum velocity subsequent to the initial reduced velocity path or period of time for the remainder of the injection cycle whereby the actuator/valve pin travels at a less than maximum velocity for an entire closed GC to fully open EOS cycle.

In the FIGS. 5A-5D examples, FOV is 100 mm/sec. Typically, when the time period or path length for driving the pin 1041 at reduced velocity has expired or been reach and the pin tip 1142 has reached the position COP, COP2, the restriction valve 600 is opened to full 100% open velocity FOV position such that the pins 1041, 1042 are driven at the maximum velocity or rate of travel that the hydraulic system is capable of driving the actuators 941, 942. Alternatively, the pins 1041, 1042 can be driven at a preselected FOV velocity that is less than the maximum velocity at which the pin is capable of being driven when the restriction valve 600 is fully open but is still greater than the selected reduced velocities that the pin is driven over the course of the RP, RP2 path to the COP, COP2 position.

At the expiration of the predetermined reduced velocity drive time, the pins 1041, 1042 are typically driven further upstream past the COP, COP2 position to a maximum end-of-stroke EOS position. The upstream COP, COP2 position is downstream of the maximum upstream end-of-stroke EOS open position of the tip end 1142 of the pin. The length of the path RP or RP2 is typically between about 2 and about 8 mm, more typically between about 2 and about 6 mm and most typically between about 2 and about 4 mm. In practice the maximum upstream (end of stroke) open position EOS of the pin 1041, 1042 ranges from about 8 mm to about 18 inches upstream from the closed gate position GC.

The controller 16 includes a processor, memory, user interface and circuitry and/or instructions that receive and execute the user inputs of percentage of maximum valve open or percentage of maximum voltage or current input to the motor drive for opening and closing the restriction valve, time duration for driving the valve pin at the selected valve openings and reduced velocities.

Figure 6A:
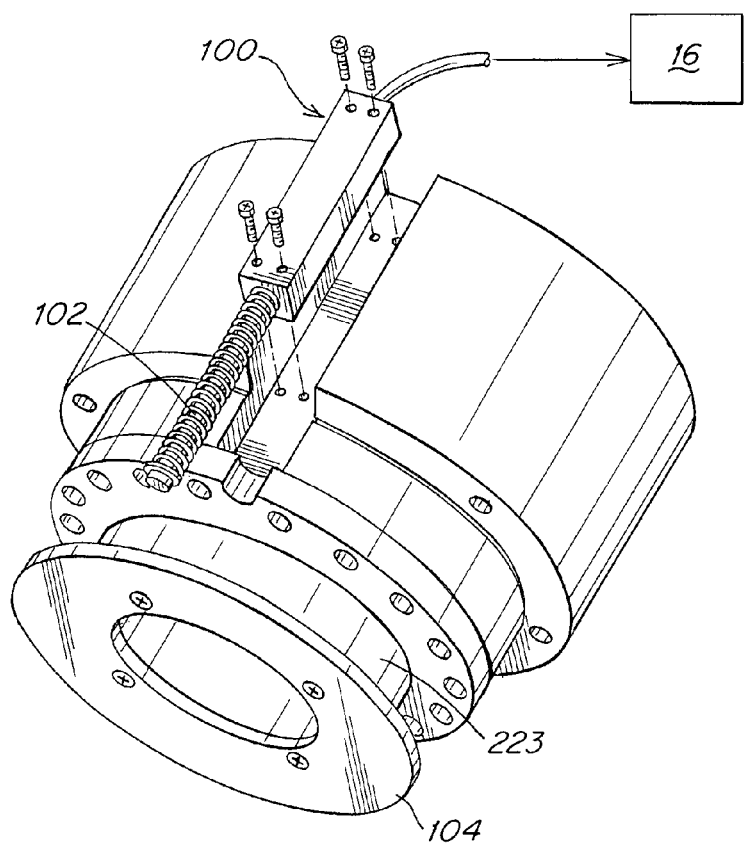
FIGS. 6A-6B show various embodiments of position sensors that can be used in a variety of FIG. 2A embodiments of the invention, the sensors shown in these figures being mounted so as to measure the position of the piston component of the actuator which is indicative of the position of the valve pin relative to the gate.
Figure 6B:
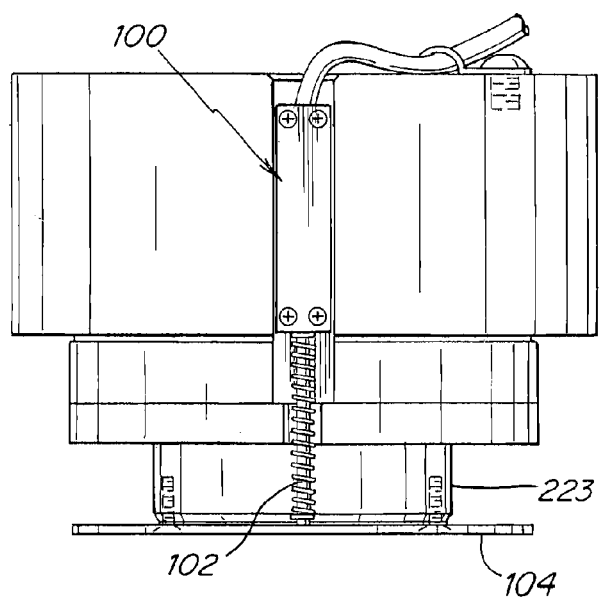
Figure 6C:
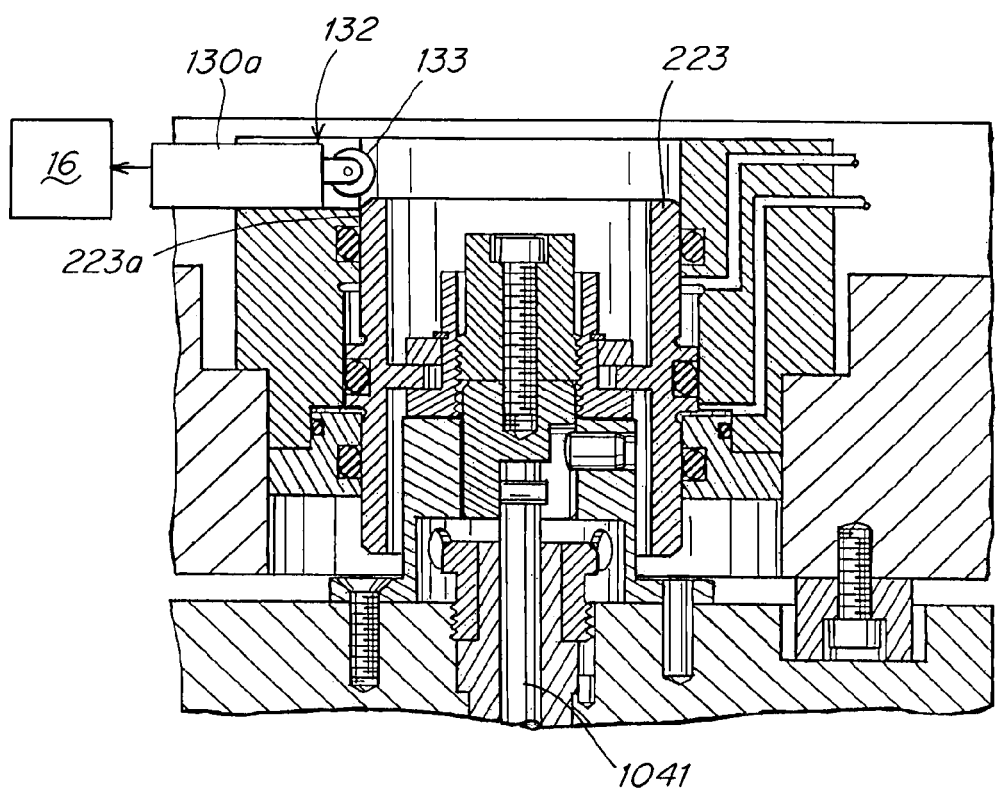
FIGS. 6C-6D show embodiments using limit switches that detect and signal specific positions of the actuator that can be used in a variety of FIG. 2A embodiments of the invention to determine velocity, position and switchover to higher openness of valve restrictor and/or upstream velocity of travel of the actuator and valve pin.
Figure 6D:
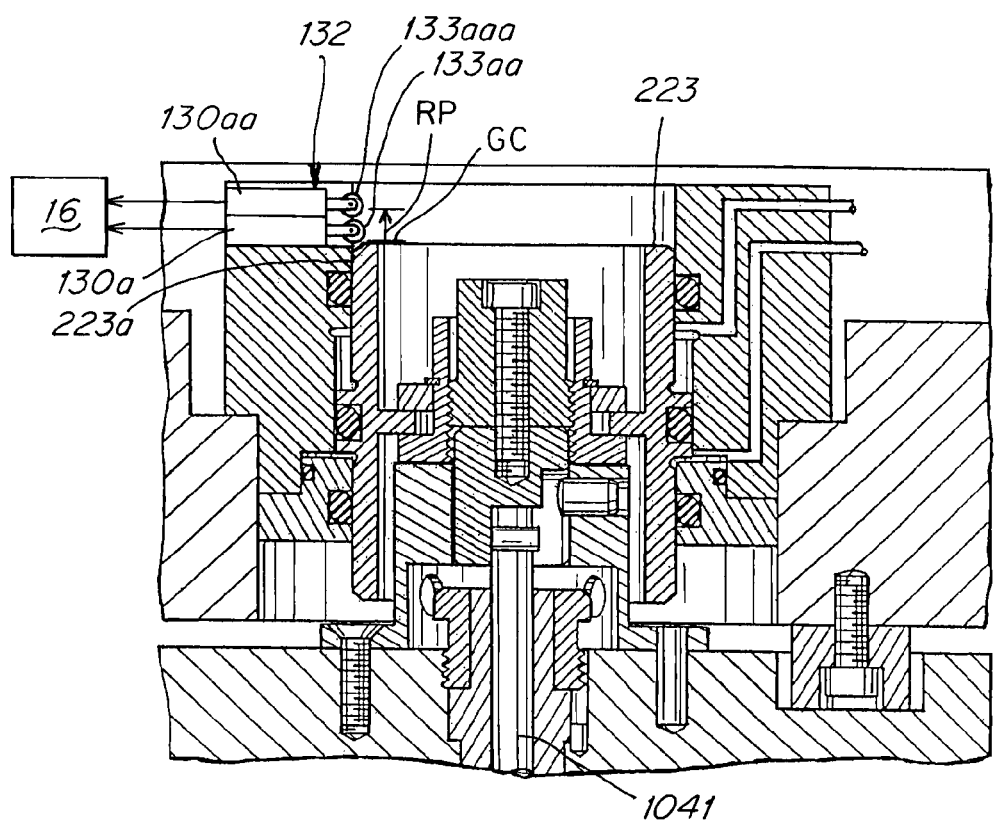

With regard to embodiments where the use of a position sensor is employed, FIGS. 6A-6D show various examples of position sensors 100, 114, 227, 132 the mounting and operation of which are described in U.S. Patent Publication no. 20090061034 the disclosure of which is incorporated herein by reference. As shown the position sensor of FIGS. 6A and 6B for example can track and signal the position of the piston of the actuator piston 223 continuously along its entire path of travel from which data pin velocity can be continuously calculated over the length of RP, RP2, RP3 via spring loaded follower 102 that is in constant engagement with flange 104 during the course of travel of piston 223. Mechanism 100 constantly sends signals to controller 16 in real time to report the position of pin 1041 and its associated actuator. FIGS. 6C, 6D show alternative embodiments using position switches that detect position at specific individual positions of the actuator and its associated valve pin 1041. The FIG. 6C embodiment uses a single trip position switch 130a with trip mechanism 133 that physically engages with the piston surface 223a when the piston 223 reaches the position of the trip mechanism 133. The FIG. 6D embodiment shows the use of two separate position switches 130a, 130aa having sequentially spaced trips 133aa and 133aaa that report the difference in time or distance between each trip engaging surface 223a of the piston, the data from which can be used by controller 16 to calculate velocity of the actuator based on the time of travel of the actuator from tripping one switch 130a and then tripping the next 130aa. In each embodiment the position switch can signal the controller 16 when the valve pin 1041, 1042 has travelled to one or more selected intermediate upstream gate open positions between GC and RP, RP2 or RP3 so that the velocity of the pin can be adjusted to the selected or predetermined velocities determined by the user. As can be readily imagined other position sensor mechanisms can be used such as optical sensors, sensors that mechanically or electronically detect the movement of the valve pin or actuator or the movement of another component of the apparatus that corresponds to movement of the actuator or valve pin.

As discussed above, control over the withdrawal (upstream) velocity of actuator or pin movement is accomplished by controlling the degree of fluid pressure that exits the metering valve which in turn is controlled by controlling the degree of openness of the fluid restriction valve 600. A profile of exit fluid pressures versus time or pin position is determined in advance and input to the controller which includes a program and instructions that automatically adjust the position of valve 600 based on the real time pressure signal received from sensor 603 (or 605 or 607) to adjust the exit pressure of the drive fluid in line 703 (or 705 or 707) which in turn adjusts the rate or velocity of upstream movement of the actuator 941/valve pin 1041 (and/or actuators 1040, 1042 and valve pins 940, 942).

The invention claimed is:

1. An apparatus for controlling the rate of flow of fluid mold material from an injection molding machine to a mold cavity, the apparatus comprising:
   a manifold receiving the injected fluid mold material, the manifold having a delivery channel that delivers the injected fluid material to a first gate leading to the mold cavity;
   an actuator interconnected to a valve pin having a tip end drivable along a drive path that extends between a first position where the tip end of the valve pin obstructs the first gate to prevent the injection fluid material from flowing into the cavity, a second position upstream of the first position wherein the tip end of the valve pin restricts flow of the injection fluid through the first gate along at least a portion of the length of the drive path extending between the first position and the second position, and a third position upstream of the second position where the injection fluid material flows freely through the first gate without restriction from the tip end of the pin,
   the actuator and the valve pin being translationally driven at a controllable rate of travel by a valve system that is controllably adjustable between a start position, a plurality of intermediate drive rate positions and a high drive rate position, the actuator being driven upstream at a corresponding plurality of intermediate rates of travel when the valve system is in one or more of the plurality of intermediate drive rate positions and at a higher rate of travel than the plurality of intermediate rates of travel when the valve system is in the high drive rate position;
   a position sensor,
   a pressure sensor,
   a controller,
   the position sensor sensing the position of the valve pin and sending a signal indicative of the position of the pin to the controller;
   the pressure sensor sensing a metered pressure of a drive fluid flowing out of an exit of the valve system, the metered pressure corresponding to a drive rate position of the valve system, the pressure sensor sending a signal indicative of the metered pressure to the controller:
   the controller instructing the valve system to drive the actuator and the valve pin continuously upstream from the start position to the second position to the third position;
   the controller including instructions that instruct the valve system to move according to a predetermined profile of metered pressures versus pin positions from the start position to selected ones of the plurality of intermediate drive rate positions that correspond to the profile of metered pressures and subsequently move from the selected ones of the plurality of intermediate drive rate positions to the high drive rate position on receipt by the controller of a signal from the position sensor that is indicative of the valve pin having reached the second position.

2. The apparatus of claim 1 further comprising an electrical signal generating device interconnected to the valve system to controllably drive the valve system to selected degrees of openness, the electrical signal generating device generating an electrical signal of controllably variable degree of output, the valve system being adjustable in degree of openness that is approximately proportional to the degree of output of the electrical signal.

3. The apparatus of claim 2 wherein the electrical signal generating device is interconnected to the controller, the controller instructing the electrical signal generating device to generate electrical signals of varying degrees of output that correspond to a degree of openness of the one or more intermediate drive rate positions and the third drive rate position of the valve system.

4. The apparatus of claim 1 wherein the portion of the drive path over which the flow of injected material is restricted is at least about 30% of the length of the drive path between the first position and the second position.

5. The apparatus of claim 1 wherein the length of the drive path between the first position and the second position is between about 1 mm and about 5 mm.

6. The apparatus of claim 3 wherein the length of the drive path between the first position and the second position is between about 1 mm and about 5 mm.

7. The apparatus of claim 1 wherein the valve pin and actuator are driven at a a maximum rate of upstream travel that the valve system is capable of driving the actuator at when the valve system is in the high drive rate position.

8. The apparatus of claim 1 wherein the rate of travel of the valve pin corresponding to the highest of the one or more intermediate drive positions of the valve system is less than about 75% of the rate of travel of the valve pin corresponding to the high drive position.

9. The apparatus of claim 1 wherein the positions of the valve system each have a different degree of openness, the actuator and valve pin being driven at a velocity that is proportional to the degree of openness of the positions of the valve system, the controller instructing the generation of an electrical signal that adjusts the valve system to a degree of openness that is proportional to a degree of output of the electrical signal, the controller being programmable to instruct the generation of one or more first electrical signals having one or more corresponding first selected degrees of output that moves the valve system to the one or more intermediate drive rate positions to drive the actuator at one or more first velocities in an upstream direction, the controller being programmed to instruct the generation of a second electrical signal when the controller receives a signal from the position sensor that the tip end of the valve pin has reached the second position, the second electrical signal having a second selected degree of output that moves the valve system to the high drive rate position that drives the actuator at a second velocity that is higher than the one or more first velocities.

10. The apparatus of claim 9 wherein the valve system is driven to a degree of openness that is approximately proportional to the degree of output of the electrical signal.

11. A sequentially gated molding system comprising a mold having first and second gates leading to a common cavity and a manifold having first and second fluid flow channels respectively delivering a fluid mold material through the first and second gates into the cavity, the system comprising:
   a first valve controlling delivery of the fluid material through the first gate into the cavity beginning at a first time;
   a second valve controlling delivery of the fluid material through the second gate beginning at a second time subsequent to the first time such that the fluid material has entered the cavity through the first gate and approached the second gate prior to the second time;
   the second valve comprising an an actuator interconnected to a valve pin having a tip end drivable along a drive path that extends between a first position where the tip end of the valve pin obstructs the second gate to prevent the injection fluid material from flowing into the cavity, a second position upstream of the first position wherein the tip end of the valve pin restricts flow of the injection fluid through the second gate along at least a portion of the length of the drive path extending between the first position and the second position, and a third position upstream of the second position where the injection fluid material flows freely through the second gate without restriction from the tip end of the pin,
   the actuator and the valve pin being translationally driven at a controllable rate of travel by a valve system that is controllably adjustable between a start position, a plurality of intermediate drive rate positions and a high drive rate position, the actuator being driven upstream at a corresponding plurality of intermediate rates of travel when the valve system is in one or more of the plurality of intermediate drive rate positions and at a higher rate of travel than the plurality of intermediate rates of travel when the valve system is in the high drive rate position;
   a position sensor,
   a pressure sensor,
   a controller,
   the position sensor sensing the position of the valve pin and sending a signal indicative of the position of the pin to the controller;
   the pressure sensor sensing a metered pressure of a drive fluid flowing out of an exit of the valve system, the metered pressure corresponding to a drive rate position of the valve system, the pressure sensor sending a signal indicative of the metered pressure to the controller:
   the controller instructing the valve system to drive the actuator and the valve pin continuously upstream from the start position to the second position to the third position;
   the controller including instructions that instruct the valve system to move according to a predetermined profile of metered pressures versus pin positions from the start position to selected ones of the plurality of intermediate drive rate positions that correspond to the profile of metered pressures and subsequently move from the selected ones of the plurality of intermediate drive rate positions to the high drive rate position on receipt by the controller of a signal from the position sensor that is indicative of the valve pin having reached the second position.

12. A method of performing an injection molding cycle in an injection molding apparatus comprising:
   a manifold that receives an injection fluid mold material, the manifold having a delivery channel that delivers the injection fluid mold material under an injection pressure to a first gate of a mold cavity,
   an actuator drivably interconnected to a valve pin having a tip end drivable along a drive path that extends between a first position where the tip end of the valve pin obstructs the gate to prevent the injection fluid material from flowing into the cavity, a second position upstream of the first position wherein the tip end of the valve pin restricts flow of the injection fluid along at least a portion of the length of the drive path extending between the first position and the second position, and a third position upstream of the second position where the injection fluid material flows freely without restriction from the tip end of the pin through the first gate,
   the actuator being driven by a valve system that is controllably adjustable between a start position, a plurality of intermediate drive rate positions and a high drive rate position, the actuator being driven upstream at a plurality of corresponding intermediate rates of travel when the valve system is in one of the plurality of intermediate drive rate positions and at a higher rate of travel than the plurality of intermediate rates of travel when the valve system is in the high drive rate position,
   the valve system including a fluid flow line routing a drive fluid out of an exit of the valve system under a metered pressure,
   the method comprising:
   selecting the length of travel between the first position and the second position,
   sensing the metered pressure of the drive fluid within the fluid flow line,
   sensing the position of the valve pin,
   selecting a profile of metered pressures versus position of the valve pin where the profile of metered pressures correspond to selected ones of the plurality of intermediate drive rate positions,
   beginning an injection cycle with the tip end of the valve pin in the first position and the valve system in the start position,
   adjusting the valve system according to the selected profile to operate at the selected ones of the plurality of intermediate drive rate positions to drive the tip end of the valve pin continuously upstream from the first position to the second position,
   sensing the position of the valve pin to determine when the tip end of the valve pin has reached the second position,
   adjusting the valve system to operate at the high drive rate position to drive the tip end of the valve pin continuously upstream at the higher rate of travel when the tip end of the valve pin has been determined in the step of sensing to have reached the second position.

13. The method of claim 12 wherein the step of adjusting the valve system to operate at the one or more selected intermediate drive rate positions is begun after the injection fluid mold material has been previously injected into the cavity through another gate and the fluid mold material has travelled through the cavity past the first gate.

14. The method of claim 12 wherein the step of adjusting the valve system to operate at the one or more selected intermediate drive rate positions comprises adjusting the valve system to operate at a single intermediate drive rate position.

15. The method of claim 12 wherein the high drive rate position of the valve system drives the actuator at a rate of travel that is a maximum at which the valve system is capable of driving the actuator.

16. The method of claim 12 wherein the valve system is interconnected to an electrical signal generating device operable to generate an electrical signal of controllably variable degree, the valve system being adjustable in position to increase the flow of drive fluid to a degree that is proportional to the degree of electrical signal input by the electrical signal generating device to the valve system, the steps of adjusting the valve system comprising operating the electrical signal generating device to adjust the positions of the valve system.

17. The method of claim 12 wherein each of the start, intermediate drive rate and high drive rate positions of the valve system have a different degree of openness, the drive fluid of the valve system driving the actuator and the valve pin at a rate that is approximately proportional to the degree of openness of the positions of the valve system, the one or more intermediate drive rate positions having a degree of openness that is less than the degree of openness of the high drive rate position.

18. The method of claim 12 wherein the length of travel between the first position and the second position along the drive path is selected to be between about 1 mm and about 5 mm.

19. The method of claim 12 wherein the step of sensing includes sensing the position of the valve pin with a position sensor that automatically sends one or more signals indicative of the position of the tip end of the valve pin to a control mechanism that automatically adjusts the positions of the valve system in response to receipt of the one or more signals from the position sensor.

20. The method of claim 19 wherein the control mechanism comprises an electrical signal generating device operable to generate an electrical signal of controllably variable degree, the valve system being adjustable in position to a degree of openness that is approximately proportional to the degree of electrical signal input by the electrical signal generating device to the valve system, the steps of adjusting the valve system comprising operating the electrical signal generating device to controllably adjust the degree of electrical signal input to the valve system.

21. The method of claim 12 wherein the tip end of the valve pin restricts flow of the injection fluid along the entire length of the drive path extending between the first position and the second position.

22. A method of performing an injection molding cycle in an injection molding apparatus comprising:
an injection molding machine and a manifold that receives an injected mold material from the injection molding machine, the manifold having a delivery channel that delivers the mold material under an injection pressure to a first gate of a mold cavity,
an actuator interconnected to a valve pin driving the valve pin from a first position where the tip end of the valve pin obstructs the gate to prevent the injection fluid material from flowing into the cavity, upstream to a second position upstream of the gate where the mold material flows at a high rate through the gate and continuously upstream from the start position through one or more intermediate positions between the first position and the second position wherein the tip end of the valve pin restricts flow of the injection mold material to one or more rates less than the high rate,
a valve system for controllably driving the valve pin, the valve system being controllably movable from a start position to a plurality of intermediate drive rate positions and a high drive rate position, the high drive rate position driving the pin upstream at a high rate of travel, the intermediate drive rate positions driving the pin upstream at one or more intermediate rates of travel that are less than the high rate of travel,
the valve system including a fluid flow line routing a drive fluid out of an exit of the valve system under a metered drive pressure,
the method comprising:
selecting one or more lengths of time for the valve system to operate or reside in one or more of the plurality of intermediate drive rate positions,
beginning an injection cycle with the tip end of the valve pin in the first position and the valve system in the start position,
sensing the metered pressure of the drive fluid within the fluid flow line,
selecting a profile of metered pressures versus the selected one or more lengths of time where the profile of metered pressures correspond to selected ones of the plurality of intermediate drive rate positions,
adjusting the valve system according to the selected profile to operate at the selected ones of the plurality of intermediate drive rate positions for the selected one or more lengths of time to drive the valve pin continuously upstream.

23. The method of claim 22 wherein the step of adjusting comprises operating the valve system at one or more selected intermediate drive rate positions for the length of an entire injection cycle where the pin travels from the first position to an end of stroke position with the valve system in one or more selected intermediate drive rate positions.

24. The method of claim 22 further comprising adjusting the valve system to operate at the high drive rate position to drive the tip end of the valve pin continuously upstream at the high rate of travel upon expiration of the selected one or more lengths of time.

25. The method of claim 24 wherein the valve system is adjusted to operate at the one or more intermediate drive rate positions after the mold material has been injected into the cavity through another gate and has travelled through the cavity past the first gate.

26. The method of claim 24 wherein the valve system is adjusted to operate at a single intermediate drive rate position for a single selected length of time.

27. The method of claim 24 wherein the valve system is interconnected to an electrical signal generating device operable to generate electrical signals of controllably variable output, the valve system being adjustable in drive rate position to increase the flow of drive fluid to a degree that is proportional to the degree of output of the electrical signals, the steps of adjusting the valve system comprising operating the electrical signal generating device to generate electrical signals that adjust the drive rate positions of the valve system according electrical signals of selected degree of output.

28. The method of claim 24 wherein each of the drive rate positions of the valve system have a degree of openness, the drive fluid of the valve system driving the actuator and the valve pin at a rate that is proportional to the degree of openness of the positions of the valve system, the one or more intermediate drive rate positions having a degree of openness that is less than the degree of openness of the high drive rate flow position.

29. The method of claim 24 wherein the length of travel between the first position and the one or more intermediate positions along the drive path is between about 1 mm and about 5 mm.

30. An apparatus for controlling the rate of flow of mold material to a mold cavity, the apparatus comprising:
an injection molding machine and a manifold that receives the injected mold material from the machine, the manifold having a delivery channel that delivers the mold material at one or more flow rates through a gate to the mold cavity,
an actuator interconnected to a valve pin having a tip end, the actuator being drivable to move the valve pin along a path of travel starting from a downstream gate closed position continuously upstream to and through a series of successively upstream intermediate upstream gate open positions and further continuously upstream to a high upstream gate open position,
a valve system in fluid communication with the actuator to drive the actuator with drive fluid at one or more rates of travel, the valve system having a start position, a plurality of intermediate drive rate positions and a high drive rate position, the start position holding the valve pin in the gate closed position, the high drive rate position driving the actuator upstream at a selected high velocity, the plurality of intermediate drive rate positions driving the actuator upstream at one or more corresponding velocities that are less than the selected high velocity,
a controller interconnected to the valve system, the controller being adapted to control movement of the valve system between the start position, the plurality of intermediate drive rate positions and the high drive rate position,
a pressure sensor sensing a metered pressure of a drive fluid flowing out of an exit of the valve system, the metered pressure corresponding to a drive rate position of the valve system, the pressure sensor sending a signal indicative of the metered pressure to the controller;
the controller including instructions that instruct the valve system to move from the start position to selected ones of the plurality of intermediate drive rate positions according to a predetermined profile of metered pressures versus one or more preselected amounts of time and further drives the valve system to move from the selected ones of the plurality of intermediate drive rate positions to the high drive rate position on expiration of the one or more preselected amounts of time.

31. The apparatus of claim 30 wherein the positions of the valve system each have a corresponding degree of openness, the controller being adapted to generate an electrical signal of selectable degree of output, the degree of openness of the positions of the valve system being proportional to the degree of output of the electrical signal generated by the controller.

32. The apparatus of claim 31 wherein the output of the electrical signal is one or more of electrical energy, electrical power, voltage, current or amperage.

33. The apparatus of claim 31 wherein the degree of openness of the positions of the valve system each have a corresponding rate of flow of the drive fluid that is proportional to the corresponding degree of openness of the positions of the valve system.

34. The apparatus of claim 31 wherein
the tip end of the valve pin obstructs the gate to prevent the mold material from flowing into the cavity in the first position, the mold material flows at the high rate through the gate in the second position and the tip end of the valve pin restricts the flow of the mold material to less than the high rate in the one or more intermediate upstream positions between the first position and the second position, and
wherein the valve pin is in one or more of the intermediate upstream positions when the valve system is in the one or more intermediate drive rate positions.

35. The apparatus of claim 30 wherein the rate of travel of the actuator that corresponds to a highest of the one or more intermediate drive rate positions of the valve system is less than about 75% of the rate of travel of the actuator that corresponds to the high drive rate position of the valve system.

36. The apparatus of claim 30 wherein each of the positions of the valve system have a corresponding degree of openness, the actuator being driven at a velocity that is proportional to the degree of openness of the positions of the valve system, the electrical signals generated by the controller each having a degree of output that adjusts the valve system to a degree of openness that is proportional to the degree of output of the electrical signals.

37. The apparatus of claim 34 wherein the controller is programmable to automatically generate one or more first electrical signals having one or more corresponding first selected degrees of output that move the valve system to the one or more intermediate drive rate positions to drive the actuator continuously upstream at one or more corresponding first velocities that are less than the high velocity, the controller generating a second electrical signal on expiration of the one or more predetermined amounts of time, the second electrical signal having a second selected degree of output that moves the valve system to the high drive rate position to drive the actuator at the high velocity.

38. The apparatus of claim 30 wherein the controller includes electrical or electronic instructions interconnected to an electrical signal generator that automatically instructs the electrical signal generator to generate the electrical signals that drive the valve system to move from the start position to the one or more intermediate drive positions and to remain in the one or more intermediate drive positions for the one or more predetermined amounts of time and further instructs the electrical signal generator to generate an electrical signal that drives the valve system to move from the one or more intermediate drive positions to the high drive position on expiration of the one or more predetermined amounts of time.

39. The apparatus of claim 38 wherein each of the positions of the valve system have a corresponding degree of openness, the actuator being driven at a velocity that is proportional to the degree of openness of the positions of the valve system, the electrical signals generated by the controller each having a degree of output that adjusts the valve system to a degree of openness that is proportional to the degree of output of the electrical signals.

40. The apparatus of claim 39 wherein the output of the electrical signal is one or more of electrical energy, electrical power, voltage, current or amperage.

41. A sequentially gated molding system comprising a mold having first and second gates leading to a common cavity and a manifold having first and second fluid flow channels respectively delivering a fluid mold material through the first and second gates into the cavity, the system comprising:
- a first valve controlling delivery of the fluid material through the first gate into the cavity beginning at a first time;
- a second valve controlling delivery of the fluid material through the second gate beginning at a second time subsequent to the first time such that the fluid material has entered the cavity through the first gate and approached the second gate prior to the second time;
- the second valve comprising an an actuator interconnected to a valve pin having a tip end, the actuator being drivable to move the valve pin along a path of travel starting from a downstream gate closed position continuously upstream to and through a series of successively upstream intermediate upstream gate open positions and further continuously upstream to a high upstream gate open position,
- a valve system in fluid communication with the second actuator to drive the second actuator with drive fluid at one or more rates of travel, the valve system having a start position, a plurality of intermediate drive rate positions and a high drive rate position, the start position holding the valve pin in the gate closed position, the high drive rate position driving the second actuator upstream at a selected high velocity, the plurality of intermediate drive rate positions driving the actuator upstream at one or more corresponding velocities that are less than the selected high velocity,
- a controller interconnected to the valve system, the controller being adapted to control movement of the valve system between the start position, the plurality of intermediate drive rate positions and the high drive rate position, a pressure sensor sensing a metered pressure of a drive fluid flowing out of an exit of the valve system, the metered pressure corresponding to a drive rate position of the valve system, the pressure sensor sending a signal indicative of the metered pressure to the controller;
- the controller including instructions that instruct the valve system to move from the start position to selected ones of the plurality of intermediate drive rate positions according to a predetermined profile of metered pressures versus one or more preselected amounts of time and further drives the valve system to move from the selected ones of the plurality of intermediate drive rate positions to the high drive rate position on expiration of the one or more preselected amounts of time.

* * * * *